United States Patent [19]

Edwards et al.

[11] Patent Number: 5,604,528
[45] Date of Patent: Feb. 18, 1997

[54] METHOD AND APPARATUS FOR PROVIDING PERIODIC SUBSCRIPTION TELEVISION SERVICES

[75] Inventors: Robert J. Edwards, Lawrenceville; Gregory S. Durden, Jonesboro; Himanshu R. Parikh, Lawrenceville; Paul Borsetti, Jr.; Vibha Rustagi, both of Duluth, all of Ga.

[73] Assignee: Scientific-Atlanta, Inc., Atlanta, Ga.

[21] Appl. No.: 239,980

[22] Filed: May 9, 1994

Related U.S. Application Data

[63] Continuation of Ser. No. 895,582, Jun. 10, 1992, Pat. No. 5,311,325.

[51] Int. Cl.⁶ .................................................. H04N 7/167
[52] U.S. Cl. ........................... 348/5.5; 380/7; 380/20; 380/23; 455/1; 340/825.31; 340/825.34
[58] Field of Search .............................. 348/1, 5.5, 6, 7, 348/9, 10, 12, 8; 455/1; 340/825.31, 825.34; 380/7, 20, 23, 10

[56] References Cited

U.S. PATENT DOCUMENTS 4,430,669  2/1984  Cheung ..................................... 380/20
4,912,760  3/1990  West, Jr. et al. ............................. 380/7
4,963,966  10/1990 Harney et al. .
4,994,908  2/1991  Kuban et al. ................................ 348/8
5,014,309  5/1991  West, Jr. ..................................... 380/7
5,045,816  9/1991  Bramhall et al. .

*Primary Examiner*—Bernarr E. Gregory
*Attorney, Agent, or Firm*—Banner & Witcoff, Ltd.

[57] ABSTRACT

A method and apparatus for providing periodic subscription television services comprises a way for subscribers who cannot afford the fees for full time television services such as a regular cable television service to obtain subscription service to a plurality of allocated channels on a periodic basis. The method comprises the steps of allocating channels to a periodic service offering and storing in memory of service denial apparatus service code data which represents the allocated channels. The service denial apparatus for providing periodic service comprises a service denial device such as a switch 389 or other circuit controlled by a controller 260 of service denial apparatus for periodically closing and opening service lines to the periodic service subscriber in accordance with predetermined periodic service intervals. For example, one periodic subscription television service offering may be a weekend service whereby the periodic service subscriber is connected to receive a predetermined plurality of channels from 6 PM on a Friday evening through 12 PM on a Sunday evening.

23 Claims, 9 Drawing Sheets

METHOD AND APPARATUS FOR PROVIDING PERIODIC SUBSCRIPTION TELEVISION SERVICES

This application is a continuation of application Ser. No. 07/895,582, filed Jun. 10, 1992, now U.S. Pat. No. 5,311,325.

BACKGROUND OF THE INVENTION

1. Technical Field

The present invention relates to the field of subscription television equipment and, more particularly, to a method and apparatus for use in subscription television systems whereby a subscriber to subscription television services may periodically receive service with minimal supervision and control by the service provider. For example, one periodic subscription television service offering according to the principles of the present invention may be a weekend service whereby the subscriber is automatically connected from 6 PM on a Friday evening through 12 PM midnight on a Sunday night to receive a predetermined plurality of channels allocated to the periodic (weekend) service offering.

2. Description of Relevant Background Information

A problem has recently surfaced primarily in the cable television field in high density population areas. There may be a considerable so-called embedded base in terms of the costs of establishing a distribution cable network connecting subscribers with a central service control point, hereinafter, a headend. Furthermore, besides establishing a cable television signal distribution system, multiple dwelling units and other homes may be pre-wired for so-called drop wires from the distribution cable system into the subscribers' homes. Furthermore, within the homes, there may be equipment which is owned by the cable television service provider such as terminal equipment. Such terminal equipment may represent a considerable investment in a given subscriber.

With this large embedded base, there is a requirement to maximize its utilization by potential subscribers while minimizing the costs associated with providing various services. Many would-be subscribers, however, are unable to afford the costs of subscribing on a regular or continuous basis to services. Such customers, however, in accordance with the principles of the present invention, may be able to afford periodic subscription services, provided, of course, that such services are reasonably priced.

An associated problem to reducing the costs of services is that of alleviating the need for cable television service personnel to visit a subscriber's premises in order to install service. One solution to the problem of alleviating the need for service visits for service installations is for a system operator to utilize so-called addressable interdiction or related service denial technologies for provision of services in place of so-called scrambling/descrambling technologies which require that equipment be provided on the subscribers' premises. The service denial equipment may be located external to the premises, for example, in the instance of a multiple dwelling unit, in a locked equipment closet. Service is then addressably authorized or deauthorized by selectively actuating the program denial equipment via a series of transactions from the headend to the multiple dwelling unit.

Interdiction equipment, for example, as described in copending commonly assigned U.S. application Ser. No. 07/625,901, filed Nov. 27, 1990, entitled "CATV Pay-Per View Interdiction System," now U.S. Pat. No. 5,245,420, is adapted to transmit all television channels from a central signal source or headend in the clear over the cable distribution plant to the service denial apparatus. Jamming signal oscillators and a subscriber disconnect switch are associated with the service denial apparatus for jamming any selected channels of these delivered television channels which the subscriber is not authorized to receive. For a regular service customer, typically their subscriber disconnect switch is in a closed or connect condition (except, for example, when the system operator opens the switch and terminates or disconnects the subscriber's service for lack of payment). When connected, the subscriber receives signal for all channels, but those channels the subscriber is not authorized to receive are jammed with interfering signals generated locally at the service denial apparatus by the oscillators. With the subscriber disconnect switch in the open or disconnect position, the subscriber receives no signal at all from the service provider.

Them is no or only a limited requirement for terminal equipment on the subscribers' premises because most television receivers today are so-called cable ready in that they are provided with means for tuning to and receiving a broadband cable television channel. A cable ready television receiver, for example, may be tuned to receive hundreds of channels for television stations ranging from public interest stations and off-the-air broadcast stations to stations dedicated to premium cost programming.

The problem with utilizing known systems for providing periodic services to a subscriber who desires them is that the same number and complexity of transactions would be required for a so-called periodic service subscriber as are required for a full time or regular service subscriber. Consequently, periodic services cannot be provided economically in known systems because of the high costs of periodically authorizing and deauthorizing service to a given subscriber.

On the other hand, the market in a large metropolitan area among new potential subscribers, who could not otherwise afford regular service, for a basic periodic service offering, for example, weekend access to a limited number of channels, may be great. Thus, while a new previously untapped market for an inexpensive periodic basic service offering exists, it is not possible to provide such a periodic service offering presently because such a service offering would have to be offered at the same price or, even, at a higher price than a regular service offering.

One common add-on or premium service to regular cable service provided today by cable television service providers is that of pay-per-view service in which events are preauthorized for viewing on a particular channel for a particular length of time. For example, a regular service subscriber will call a cable television service provider in advance of a pay-per-view program such as a rock concert and indicate they wish to receive and arrange for payment for the premium cost program.

The service provider assures payment for the premium cost program and utilizes certain additional other communications between the headend and the service providing equipment than those required for regular service authorization to permit or deny reception on the premium channel at the preprogrammed time. Most importantly, this set of communications for pay-per-view services is different from and represents a subset of those required for regular service authorization. For example, the regular service subscriber is already authorized to receive service over a large number of channels. The pay-per-view communications simply serve to permit or deny service on a particular additional channel which may be dedicated for premium cost programs at the preprogrammed time. Yet this subset of communications for pay-per-view services still achieves the objective of assuring that the regular service subscriber is provided access to the desired pay-per-view program at its scheduled hour.

In connection with such communications, the pay-per-view program is given a data code, hereinafter an event data code, specifying the premium channel the event is to be received on and a sequence number. The sequence data is a data code related to the duration of the program and how frequently event data codes are updated in memory of service denial apparatus. Consequently, the channel and sequence data, taken together, comprise a pay-per-view event code for a particular pay-per-view program in this known system. Furthermore, after the program is over, the service provider denies access to the channel or station on which the pay-per-view program appeared by means of another simple communication. The event data code may be erased from memory or, more simply, a status data bit for the event (hereinafter, an in-use bit) may be changed from an in-use indication to an not in-use indication.

System operators currently have means at their disposal to provide unbilled-for or free service on an otherwise premium channel. By way of example, all regular service subscriber may be provided with an opportunity to view a short portion of a premium program for a predetermined period of time. At a system control location, for example, at the headend, a transaction may be accomplished for loading a free preview into system controller memory. The preview transaction defines the premium channel and the time period for free service. The preview transaction assumes that the subscriber is in good standing and their subscriber disconnect switch is in its connect or closed position. A communication, then, is transmitted globally to service denial apparatus to turn off all jamming oscillators and to permit all connected subscribers to watch the otherwise unauthorized channel for the predetermined period of preview time. A purchaser of the pay-per-view event who signals his purchase of the pay-per-view event either in advance of the event or by means of so-called impulse pay-per-view data return techniques is authorized by a specifically addressed transaction to watch the channel for the entire duration (and not just a portion) of the event. However, there is no means in such systems to provide either basic service or premium services to a normally disconnected subscriber for a predetermined period of time as already described without treating the periodic service subscriber in as equally a complicated manner as is necessary to repetitively authorize a subscriber to periodic service (if known) as if they were a full-time subscriber to regular service.

Consequently, there remains a need in the art of cable television service provision generally to provide a method and associated apparatus for providing periodic subscription television services inexpensively, with a minimum of additional equipment, and with a minimum or supervision and control by the service provider.

SUMMARY OF THE INVENTION

The problems and related problems in the cable television art are solved by the principles behind the development of the present invention, a method and apparatus for providing periodic subscription television services.

It is a first object of the present invention to minimize the equipment costs of providing periodic service. In accordance with the present invention, no additional equipment need be provided beyond the embedded cable distribution plant, associated off-premises service denial apparatus and the subscriber drop from the apparatus to the subscriber's premises.

It is another object of the present invention to eliminate any requirement for a service installer to ever visit the periodic service subscriber's premises. If any equipment must be installed, the equipment associated with a periodic service offering will be installed in a locked equipment closet or in a pedestal or on a pole or otherwise installed outside the subscriber's premises.

It is another object of the present invention to minimize the number and complexity of transactions required between a headend and service denial equipment. In other words, the periodic authorization of services should be as automatic as possible so as to eliminate any need for headend intervention. A periodic basic service subscriber may be authorized and deauthorized automatically utilizing a set of communications similar to the known subset of pay-per-view related communications. The service denial equipment, on the other hand, treats the communications differently once it recognizes different and unique data codes for a periodic service from the known pay-per-view event data codes. Once the periodic service data codes are stored in memory, the service denial apparatus operatively denies or applies services to all allocated service channels at prescheduled intervals of time by means of appropriate actuation of certain operative elements of the service denial apparatus such as the subscriber disconnect switch and the jamming oscillators or selectable filters. For example, the subscriber disconnect switch of interdiction equipment is placed in its connect or closed state and jamming oscillators are actuated to jam all non-authorized channels during the prescheduled periodic service intervals.

It is another object of the present invention to program the service denial equipment to provide periodic basic services without a service installer visit. The service denial equipment may be remotely and addressably programmed from the headend to provide basic periodic services by addressably downloading any required software or data to the service denial apparatus. For example, a plurality of channels allocated to a basic periodic service offering may be downloaded as necessary with associated unique corresponding service data codes for storage in service denial apparatus for a plurality of customers. Furthermore, if no channel data is present in a data code transmission, service denial apparatus according to the present invention recognizes the absence of channel data as a signal to permit service on all channels available under a regular service offering and to jam all premium channels.

In accordance with the present invention, pay-per-view service communications are utilized at service denial apparatus for periodically permitting and denying service to subscribers in a subscription television system. The communication for periodic basic service contains message data, i.e. a service data code, different from any data utilized for known pay-per-view services, i.e. a pay-per-view event data code. The service denial apparatus upon recognizing the periodic service data code stores the code in memory in the same manner as the known system store pay-per-view data. However, a controller of the present invention associates the periodic service data code with a different set of instructions, different from those it would follow for pay-per-view service operation. For example, rather than permit service on one premium channel at a preprogrammed time as for providing pay-per-view service, the instructions may be operative to permit viewing on all channels allocated for the periodic service data code at the preprogrammed time. Similarly, at the termination of periodic service as distinguished from the termination of a pay-per-view program or event, the controller will operate to deny service on all channels allocated to a particular periodic service offering at the preprogrammed time rather than operate to deny service on the one premium channel carrying the pay-per-view program or event.

Service denial apparatus according to the present invention comprises a communications receiver for receiving communications from the service provider and a communications decoder responsive to the communications receiver for decoding received communications and extracting therefrom address data, an operation code or opcode and service code data. The address data may be global (sent to all subscribers), related to a group of subscribers (such as all subscribers served by certain service denial apparatus) or related to only one specific subscriber. A memory of the apparatus stores program instructions for periodically permitting and denying a defined periodic service on allocated service channels and also stores the periodic service data code which represents a particular periodic subscription television service offering and which is different from any event code data representing an authorized pay-per-view program. Selective service denial circuitry may comprise a subscriber disconnect switch, signal descrambling circuits, jamming oscillator circuits, traps or filters or various combinations of these which are selectively operative to permit or to deny access to all channels allocated for periodic basic service. The service denial apparatus according to the present invention preferably also includes a controller, responsive to the communications decoder and the memory, for selectively actuating the selective service denial circuitry.

A method for selectively permitting or denying service to subscribers to a periodic service is characterized by the step of storing a data code for a particular periodic subscription television service offering which as already described, is different from event data codes for pay-per-view programs and is treated differently by the controller. The controller of service denial apparatus associates a different set of instructions with the data code for a particular periodic service offering which, for example, actuates the selective service denial circuitry to permit or deny service on all channels allocated for the particular periodic service offering.

By periodic service as used herein and in the claims, there is no intention to limit the term to a narrowly defined context, for example, to only free channels (those for which any fee for reception is included in a regular subscription service fee) or even to certain free channels and not others. In accordance with the present invention, there may be several service data codes which define several different periodic subscription television services, all of which are different from those assigned to authorized pay-per-view programs. The distinction that is made between so-called periodic services and pay-per-view services is that the known pay-per-view service communication is limited to one program or event on one channel for a prescribed time. The concept of a periodic service is not so limited and relates to uniquely providing even plural codes to define periodic service offerings for different predetermined collections of channels which are permissibly accessed by subscribers for different predetermined periods or intervals of time. For example, one periodic service offering may be defined as weekend access to off-the-air broadcast channels within a certain geographical area. Another periodic service offering may be defined as weekend access to off-the-air broadcast channels from the certain geographic area and other geographic areas as well. Another periodic service offering may be defined as weekend access to all channels normally provided with a regular service offering and one or more predetermined premium cost channels. Another example of a periodic service may be defined as Sunday only access to only one or more predetermined premium channels. Such a periodic service offering may be of interest to a subscriber to a regular subscription service offering. Each such periodic service offering may have a different service data code which themselves are different from any data codes for pay-per-view services. As thus defined, even by way of example, the periodic subscription service of the present invention is an entirely different concept from that for pay-per-view service which relates, according to known systems, strictly to access to one premium channel for a limited period of time to watch a particular event.

Yet, the provision of periodic subscription television services is not only compatible with but complementary to the provision of pay-per-view services. The subscriber may be similarly authorized for service by a similar set of subscriber communications and the number and subset of communications for provision of both services may be similar. Again, the difference between the services relates to the distinct code data utilized for pay-per-view event and periodic service authorization and the association of a different set of controller instructions upon the recognition of the different codes for each type of service authorization. Furthermore, as defined above, periodic subscription service may be of interest to new subscribers who could not otherwise afford the most inexpensive of any regular service offering and, likewise, be of interest to regular subscribers. For example, a basic periodic subscription service may comprise weekend or other periodic access to all channels normally accessible to a regular subscription service subscriber at a rate less expensive than that charged for regular subscription service.

Service denial apparatus for periodic subscription television service may most conveniently comprise interdiction, jamming signal generation, service denial switch, trap, filter, controllable amplifier or other service denial apparatus located external to the customer premises. In this manner, the provision of on-premises terminal equipment may be avoided. Yet, terminal equipment on the subscriber's premises may still be provided for services such as so-called impulse pay-per-view services for reporting the purchase of a pay-per-view event via telephone lines or via a service distribution cable. Furthermore, some service providers may not find the costs prohibitive of providing other terminal equipment on a customer's premises in connection with providing periodic subscription television service such as addressable converters (which convert a signal from one radio frequency to another for reception on an associated television receiver) or addressable descrambling converters (which not only convert the signal from one radio frequency to another but also are capable of descrambling a scrambled television signal).

These and other objects, features and advantages of the present invention as well as presently preferred embodiments thereof will be fully explored in connection with the following discussion of the drawings.

BRIEF DESCRIPTION OF THE DRAWINGS

FIG. 4a showing one example of an addressed communication which may be transmitted from headend equipment to the service denial apparatus of FIG. 2 and FIG. 4b showing an example of a data memory of service denial apparatus according to the present invention for storing data associated with providing periodic subscription television services.

DETAILED DESCRIPTION

A method and apparatus for providing periodic subscription television service according to the present invention will be discussed in the context of the off-premises cable television channel interdiction apparatus disclosed in U.S. Pat. No. 4,912,760, the disclosure of which is herein incorporated by reference in respect to those features not described by the present specification. The present invention is not limited to interdiction cable television systems but is also applicable to other subscription technologies provided generally in any off-premises system, for example, positive and negative trap systems, sync suppression systems and in any other system in which service is provided to a plurality of subscriber units from an off-premises site. While an off-premises technology more closely falls within the objects of the present invention, the invention is likewise not limited to off-premises technologies but may be likewise applicable to such on-premises technologies as on-premises addressable converter and addressable descrambling converter technologies.

A detailed discussion of the interdiction system in which the present invention may be implemented is also provided in U.S. Pat. No. 4,963,966, also incorporated herein by reference as to essential subject matter. Furthermore, Application Ser. Nos. 446,695; filed Dec. 6, 1989, now U.S. Pat. No. 5,109,286, 498,084; filed Mar. 20, 1990, now U.S. Pat. No. 5,155,590, 503,423; filed Apr. 2, 1990, now U.S. Pat. No. 5,045,816, and 625,901, filed Nov. 27, 1990, now U.S. Pat. No. 5,245,420, entitled "CATV Pay Per View Interdiction System Method and Apparatus", also incorporated herein by reference, disclose details of off-premises subscription television apparatus related by subject matter to the present invention. Topics related to interdiction systems such as jamming signal frequency calibration, gain adjustment and jamming oscillator control will not be addressed in detail herein.

Figure 1:
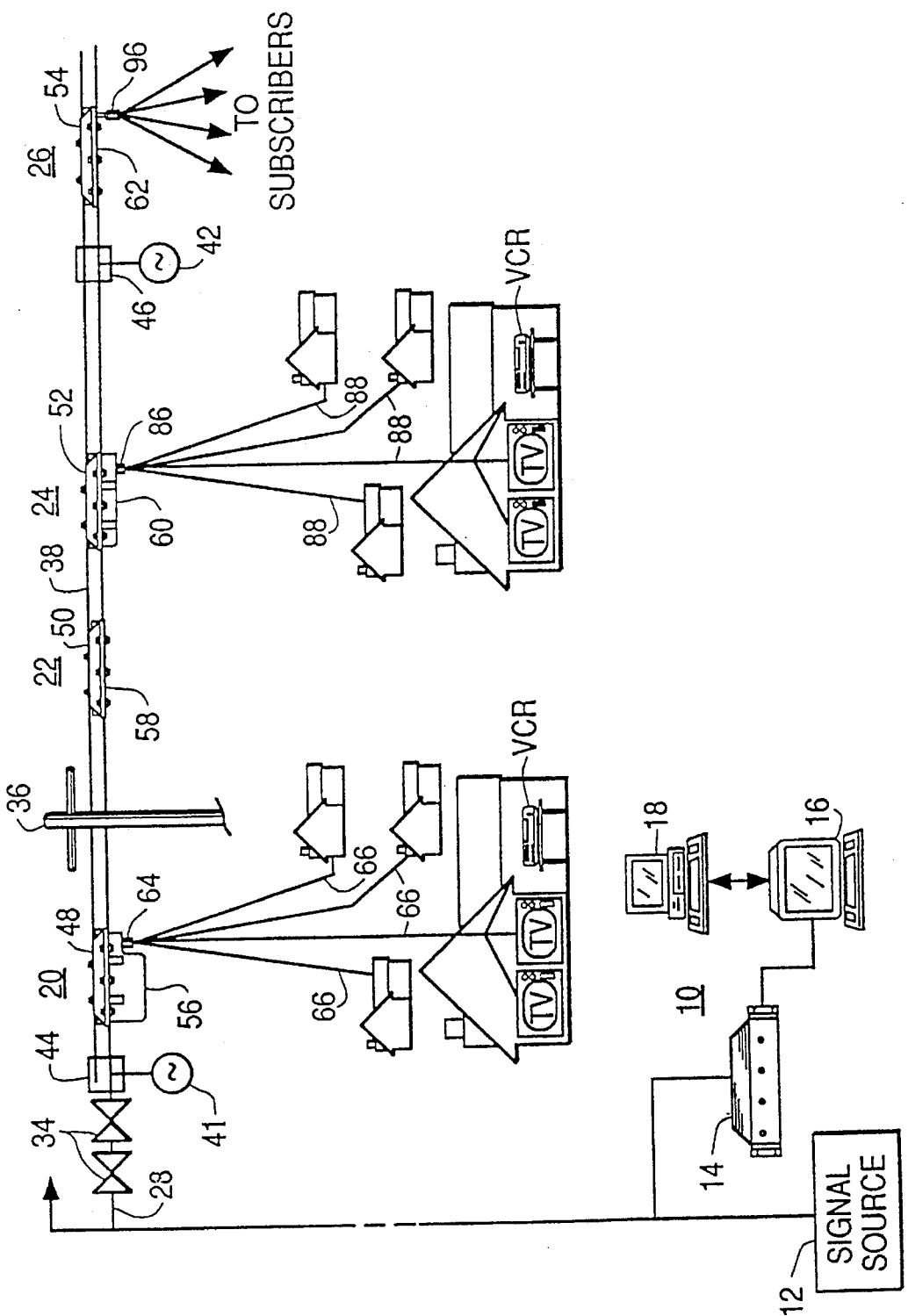
FIG. 1 is an overall system block diagram of a typical two way cable distribution plant showing an off- or on-premises cable television system including headend equipment, a one or two way distribution plant, service denial apparatus representatively shown by addressable interdiction apparatus, subscriber drops and subscriber premises television reception equipment are shown.

FIG. 1 is a general block diagram of a subscription television system and, in particular, a cable television system. By subscription television system is intended any television service delivery system such as over-the-air systems, satellite signal access systems and such television signal delivery systems. Cable television system as used herein refers to all systems involving the transmission of television signals from a signal source 12 over a transmission medium (fiber optic cable or coaxial cable) to remote locations. For example, a cable television system may comprise a community antenna television distribution system, a satellite signal distribution system, a broadcast television system, a private cable distribution network, either industrial or educational, or other forms of such systems. Each remote location of a television receiver may comprise, by way of example, the location of a particular subscriber to a subscription television service, plural subscribers, single subscribers having plural television receivers or private locations in a private cable distribution network. Consequently, the term subscriber as used herein refers to either a private subscriber or a commercial user of the subscription television system.

Headend 10 is a connecting point to a serving cable or trunk 28 for distributing television channels from signal source 12 over feeder lines to drops 66, 88 and finally to subscriber locations. For reference purposes, an Electronic Industries Association (E.I.A.) standard cable television frequency allocation scheme is employed and referred to herein. Typically in such systems, television channels of source(s) 12 are modulated and frequency division multiplexed together to comprise a broadband signal which may have a bandwidth in excess of one gigahertz. However, in accordance with the present invention, one may apply its principles to other known standard or non-standard frequency allocations. Further, a National Television Subcommittee (N.T.S.C.) standard composite television signal at baseband is generally considered in the following description. However, the principles of the present invention apply equally to other standard and non-standard baseband standard definition and proposed high definition television analog and digital or compressed digital data signal formats. Also, the principles of the present invention are not limited to television services furnished from a headend but may include utility meter reading, burglar alarm reporting, digital or other stereophonic audio delivery systems, video or telephonic or other subscription services and the like.

Headend 10 typically comprises a source of television programming 12. The television program source 12 may be a satellite television receiver output, a program produced by a television studio, program material received over a microwave or broadcast television link, a cable television link, or any other source of television or other subscription programming consistent with the present invention. The program source material need not be limited to conventional television but may comprise teletext, videotext, program audio, utility data, or other forms of communication to be delivered to a remote location over the serving cable or trunk line 28 and subsequently over feeder lines and, then, drop lines 66, 88. Communications used to authorize or terminate services or different levels of service are initiated via data entry to a computer system including a system manager computer 16 and a billing computer 18.

System manager computer 16 comprises, for example, a personal computer known in the art having a video display, a central processor, a random access and so-called hard disk memories or other non-interruptible memories, and a keyboard or other data entry device. System manager computer 16 also comprises a source of real time clock data or an internal system clock for clocking real time activities of system operation. For example, the system manager clock continuously refreshes real time clocks of service denial apparatus 20 or of subscriber terminal apparatus as described in U.S. Pat. No. 4,994,908, incorporated by reference. Another example of application of the system clock source as a real time source is the actuation of certain data communications at prescheduled times signaling the periodic actuation of periodic subscription services. Furthermore, system manager computer 16 most conveniently comprises an interface by cable or otherwise to billing computer 18 for subscriber billing recordation, periodic printing of bills and other billing and accounting tasks.

System manager computer 16 operations will be described in greater detail in connection with the following discussions of FIGS. 4 and 5. Briefly, however, a system manager operator upon receipt of an order for periodic subscription television services utilizes the system manager computer to review the status of the embedded equipment base. For example, the new potential subscriber may have just moved in to an apartment formerly the home of a subscriber. Therefore, the computer may, upon entry of a location address, identify the specific equipment already associated with that dwelling by means of well known tabular look-up processes.

The system operator also reviews the centrally recorded status of the remote memory of the service denial apparatus. For example, equipment status, whether a housing is equipped with a subscriber module, if so, whether an associated service disconnect switch or other service denial circuit is open or closed, may be checked. Furthermore, service status is checked to determine if the previous occupant has been recorded as having disconnected their service and what, if any, channel and service authorizations remain in remote memory.

The system operator having ascertained the present equipment and service status, and, assuming equipment is in place and all previous service status indications have been cleared and the billing computer appropriately notified, the system manager may be in a position to enter the new subscriber into system manager memory and actuate a transferral of billing information for the new customer to billing computer 18. Furthermore, the system manager actuates the subscriber's service denial apparatus appropriately to record in its memory, if not already recorded, current channel assignments and other so-called operating parameter assignments for a subscriber module as per FIGS. 2, and 3 for recordation in memory 270, for example.

No addressed premium channel authorization command, however, issues for a periodic service subscriber as would issue in the instance of a regular service subscriber to premium services. A periodic service subscriber will typically have an empty premium channel authorization map (not shown) in memory 270. Instead, certain pay-per-view related communications are utilized for periodic service channel authorization of regular and premium channels.

From reading the above description, one may assume that the billing computer 18 is a slave to system manager computer 16. The reverse may also be true where the system operator chooses a billing system computer from which computer, the system manager computer may be controlled.

Normally, in connection with periodic service initiation, a transaction with the system manager computer 16 automatically actuates transmission of a first addressed PPV load communication via addressable transmitter 14, a second global PPV start communication and a third global PPV Off or Purge communication. As briefly described above, the second and third communications are appropriately clocked to correspond with a system real time clock. In other words, time intervals stored in memory of system manager computer 16 are cyclicly and frequently compared with the real time clock and, at the appropriate times, the second and third communications for periodic subscription service are generated in the same manner as the known pay-per-view event communications.

A periodic service subscriber will also have access to view free previews of premium programming as will be described in connection with FIGS. 5 and 9, typically, during periods when the subscriber is connected to receive signal. However, if a weekend service is subscribed to and a free preview is authorized just after the time of their service disconnect, a periodic service subscriber will not receive the free preview and, in fact, will receive no signal. In other words, any conflict between preview time and periodic service time is resolved in favor of the periodic service. The service code controls the status of the subscriber disconnect switch and, hence, whether any signal, let alone the free preview on an authorized premium channel may be viewed.

If, on the other hand, the periodic service subscriber buys the pay-per-view event represented by the free preview, the pay-per-view event code will control in accordance with the present invention. The subscriber disconnect switch will remain closed and a periodic service signal comprising all allocated channels and the pay-per-view event channel will be delivered to the subscriber until the event ends. At the time the event ends, the subscriber disconnect switch is opened and all service is disconnected.

Service code authorization during an authorized service interval assures control override or priority over whatever channel authorizations are stored in either RAM preview memory. Since a periodic service subscriber would not be authorized to receive any premium channels, except those for purchased pay-per-view events or a subscribed-to periodic service offering, any conflict between preview authorization memory and service/event code memory authorization for premium channels is resolved in favor of the service/event code memory, for example, shown in FIG. 4b.

Free previews may be seen only when the status of the service disconnect switch 389 or related service denial circuit is in its closed position as determined for a periodic service subscriber by their subscription service code, any subscribed-to pay-per-view event codes and associated scheduled service intervals. Pay-per-view event codes and service codes are treated equally so a periodic service subscriber who purchases a pay-per-view event will receive all allocated channels and the service disconnect device will remain closed until the pay-per-view event is over.

Conventionally, trunk line 28, feeder lines, and drop lines 66, 88 are constructed of coaxial cable. For higher performance, any one of these lines may be a fiber optic cable or line. Due to the cost of the installation and the need for a high quality initial transmission from headend 10, trunk line 28 is typically constructed of fiber optic cable.

Program material provided by the signal source 12 may be included within a regular service offering or may be premium, requiring extra payment or otherwise restricted or desirably secured from receipt at unauthorized receiver locations. It may be provided over any channel, for example, of the 50–550 MHz (or larger band) cable television spectrum. "Premium channel" or "premium programming" as used herein refers to a channel or program which is secured from unauthorized receipt either because of its premium or restricted status or because a regular service subscriber must incur an additional fee for reception.

Normally, all premium programming in cable television systems is scrambled. However, in accordance with interdiction system technology, both regular service programming and premium programming are transmitted in the clear, and interdiction is applied as at off-premises interdiction apparatus (service denial apparatus) 20 to jam reception of unauthorized premium programming. Off premises apparatus 20, 22, 24, and 26 respectively comprise housings or enclosures 56, 58, 60, and 62 and covers 48, 50, 52, and 54 and internal circuitry as will be described in some detail in connection with the following discussions of FIGS. 2 and 3.

In known interdiction systems, hundreds of channels are provided in the clear and, while the entire spectrum may be jammed, only as selected portion of these hundreds of channels, for example, a number between 30 and 130, are jammed and categorized as premium channels. The number of jammable channels is limited by the degree of jamming desired and the number of jamming oscillators provided.

It is likely that cable systems will gradually make the transition to an interdiction system, for example, as new subscribers are added because of the inherent desirable features of interdiction technology. During a transition period, headend 10 may provide scrambled television programming as well as premium programming in the clear and a scrambler may be provided as long as converters/decoders remain in the system for unscrambling scrambled program transmission. For example, off premises apparatus 24 may be coupled to subscribers still having on-premises converters/decoders and off premises unit 22 may be utilized to couple new subscribers to the system. In certain instances, converter/decoders or descrambling converters at subscriber locations may later be entirely replaced by interdiction apparatus of the present invention. Descrambling or decoding equipment may also be provided at an off-premises housing.

Headend 10 includes an addressable data transmitter 14 for transmitting global commands and data downstream to all subscribers, group addressed communications to groups of subscribers or specifically addressed communications for reception by a particular subscriber. Such forward data transmission may be conducted over a separate data carrier from the cable television spectrum, for example, at 108.2 megahertz. Forward data transmission may also be over an unused default channel from the television spectrum. Global commands generally take the form of operation code and data while addressed communications further include the unique address or group address of a particular subscriber or group of subscribers.

Typically, a relatively high speed data transmission format is provided for communication between headend 10 and apparatus 56 via transmitter 14. One such format may be biphase data encoding at a data rate of at least 12 to 14 kilobits per second and preferably 19.2 kilobits per second, frequency modulated on the 108.2 MHz data carrier (in the FM radio broadcast band). Frequency shift keying, period shift keying or other related data transmission schemes may be used in the alternative. The principles surrounding appropriate data rate and format selection include meeting objectives of handling plural serial communications according to the communication arrangement of FIG. 4 and maximizing data throughput. For example, the preferred addressable data transmitter queues communications for transmission and is capable of transmitting hundreds of communications within a second.

In an alternative embodiment, forward data communications may take the form of in-band signals sent with a television channel superimposed, for example, upon an audio carrier during a special time period, for example, a period corresponding to the vertical blanking interval of the associated video signal. Such data communications further complicate data reception at interdiction apparatus and are desirably eliminated. However, in-band signaling may be required for the operation of certain addressable converter/decoders and descrambling converters known in the art.

Thus, communications and, in particular, commands to authorize service to a particular subscriber may be transmitted in-band or on a separate data carrier and typically involve transmitting an address of a particular subscriber unit or group of subscribers, a command or operation code and data. Decoders in the system receive the command, decode it, determine if the command is to be acted on, and if so perform the desired action such as provide a subscriber with pay-per-view credits or generally authorize services. Responsive to control of system manager computer 16, channel program or service authorization data is transmitted via an addressable data transmitter 14 over a trunk line 28 to feeder lines with interspersed signal amplifiers 34 and power supply equipment 41, 42, 44, 46 provided as required. The serving signal is dropped via drops 66, 88 to a subscriber location at a pole 36 or from a pedestal at underground cable locations.

Off premises unit 24 may be connected via connector 86 and drop 88 to conventional converters/decoders which serve several functions. Responsive to an addressed communication from headend transmitter 14, subscriber specific channel, service or pay-per-view program authorization data is updated in respective authorization memory portions if the address associated with the addressed communication matches a unique address of the subscriber decoder. For example, the subscriber address may comprise a plurality of bits over and above the actual number of subscribers in a system, the additional bits insuring the security of the address. Data representing the authorized premium channel, service or program is then stored in the authorization memory of the converter/decoder. Television programming is normally converted to an otherwise unused channel such as channel 3 or 4 of the television spectrum by a converter portion of converter/decoder. Its premium status is checked against the data stored in authorization memory. If the programming is authorized, the decoder portion of the converter/decoder is enabled to decode authorized scrambled premium programming.

Subscriber premises shown at the end of drops 66,88 may comprise single family dwellings, multiple family dwellings such as apartment complexes, hotels, hospitals and such and commercial establishments such as eating establishments, theaters or, even, factories. The subscriber premises shown should not be narrowly construed to comprise only single family dwelling units shown.

The provided television receiver may be a conventional television receiver or may be a so-called cable ready television receiver (TV). Because of the advent of cable ready television receivers, there is no longer a requirement at a subscriber premises for the converter portion of a converter/decoder because a converter is built into such television receivers. The television receivers may also comprise video cassette recorders (VCR) or other recording devices which are likewise cable ready and adapted to receive at least a signal comprising periodic subscription service according to the present invention. A television receiver display (TV) may be adapted for connection by the subscriber to receive over-the-air broadcasts, satellite repeated signals and other alternative sources of signals such as taped programs via video cassette recorder VCR.

In accordance with a cable television system provided with interdiction or other off-premises apparatus, units 20, 22, 24, and 26 are mounted on a strand 38 supporting the cable to a pole 36, or provided via a pedestal, as is shown more particularly in U.S. Pat. No. 4,963,966. The units may also be mounted indoors in an equipment closet of a multiple dwelling unit or of a commercial establishment or to the side of a subscriber's premises. Inside the units is common control circuitry for tapping into the broadband television and data transmission spectrum. Referring to the pole 36, there is shown a strand-mounted apparatus 56 serving four drops 66 to subscribers via connector 64. In practice, four or more subscribers and up to four or more drops 66 may be served by interdiction apparatus 20. In addition to the common control circuitry, four or more plug-in subscriber modules may be provided for an off-premises housing. Also, according to the present invention, additional services requiring two way data transmission such as subscriber polling, home shopping, burglar alarm, energy management and so-called impulse pay-per-view services may be provided via four or more special service modules comprising reverse path signal combining circuitry of apparatus 56.

Desirably, all subscription television equipment provided by a subscription service provider may be removed from the subscriber premises. However, for the provision of certain additional services, some on-premises equipment is unavoidable. For example, for impulse pay-per-view service, a subscriber transaction terminal apparatus may be provided in a subscriber's premises simply comprising a subscriber-controlled data transmitter for transmitting data on the subscriber drop 66 in only one direction, namely, to interdiction apparatus 20. For purposes of this description, the subscriber premises will be assumed to include at least one cable ready conventional television receiver, TV or VCR. Consequently, subscriber equipment need not comprise a tunable converter for converting a received cable television channel to an unused channel such as channel 3 or 4. The subscriber transaction terminal device comprises data entry or sensing means, data confirmation means, i.e., a display or alarm, if required, and a data transmitter coupled between the drop cable and the cable ready television receiver.

Power for off-premises apparatus 20 may be provided over the cable from the headend direction via power supplies 41,42 or be provided via the subscriber drop 66 or by a combination of such means. Forseeably, power may be even provided by rechargeable means such as solar cells or other external or replaceable internal sources such as batteries. The subscriber transaction terminal equipment referred to above is preferably battery powered.

All off-premises service providing apparatus 20, 22, 24, and 26 may be secured in a tamper-resistant housing or otherwise secured, for example, as described by U.S. Pat. No. 4,963,966 or secured in a locked equipment closet of an apartment complex or commercial establishment. If located in a place exposed to the elements, the housing should be water-tight. Also, the housing should be designed to preclude radio frequency leakage.

Interdiction apparatus 20 is uniquely addressable by headend 10 just as is a known converter/decoder. If two bits of a plural bit unique subscriber address are associated with uniquely identifying one plug-in slot for one of four subscriber modules, common control circuitry may be uniquely addressed with remaining address data not used to secure the data communication. In other words, four or more subscribers may be addressed as a group from headend 10. Just as premium programming is transmitted in the clear and since no data communication is necessarily required with a subscriber premises, a subscriber address need not be transmitted in a secure form. Nevertheless, address security may be desirable so long as converter/decoders or other unique address requisite equipment is provided at a premises.

Interdiction apparatus 20 comprises addressable common control circuitry, a plug-in special service module and up to four (or more) plug-in subscriber modules. Upon receipt of subscriber specific premium program, periodic subscription service, subscriber credit or channel authorization data, the data are stored at memory of common control circuitry of off-premises interdiction apparatus 20.

Interdiction apparatus 20 further comprises a diplexer for providing a forward and reverse transmission path which diplexer is coupled to automatic gain control circuitry of the common control circuitry. The common control circuitry forwards jamming frequency control data to a subscriber module. Channel interdiction circuitry associated with each subscriber module then selectively jams unauthorized programming dropped via a particular drop 66 to a particular subscriber. Consequently, interdiction apparatus 20 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises interdiction apparatus 20 or derive a signal from shielded and bonded cables which should likewise be maintained secure from radio frequency leakage. Tamper protection for apparatus 20 is described in U.S. Pat. No. 4,963,966 and in Application Ser. No. 08/088,582, filed Jul. 9, 1993, now U.S. Pat. No. 5,331,412 a continuation of U.S. Patent Application Ser. No. 07/618,687, now abandoned, filed Nov. 27, 1990 entitled "Tamper Resistant Apparatus for a CATV System".

Two way data transmission is provided via a so-called sub-split frequency spectrum comprising the band 5–30 megahertz for upstream, reverse path transmission toward headend 10 and a spectrum from 54–550 megahertz for downstream forward transmission. In particular, an amplitude shift keyed data transmission signal at approximately 5 MHz is used for communication on drop 66, while a binary phase shift keyed signal is used for upstream data transmission in the T8 band to headend 10. Distribution amplifiers 34 distributed along the distribution plant according to known prior art design techniques separate and separately amplify the two transmission bands. They are distributed along the transmission path in a manner so as to preclude the carrier-to-noise ratio of either transmission path from being too low.

Also, at a headend 10, there is located a radio frequency data receiver and data processor (not shown) for receiving data transmissions from the off- or on-premises subscriber equipment. Details of this equipment are more particularly provided by U.S. Application Ser. No. 07/498,084, incorporated as necessary by reference.

Figure 2:
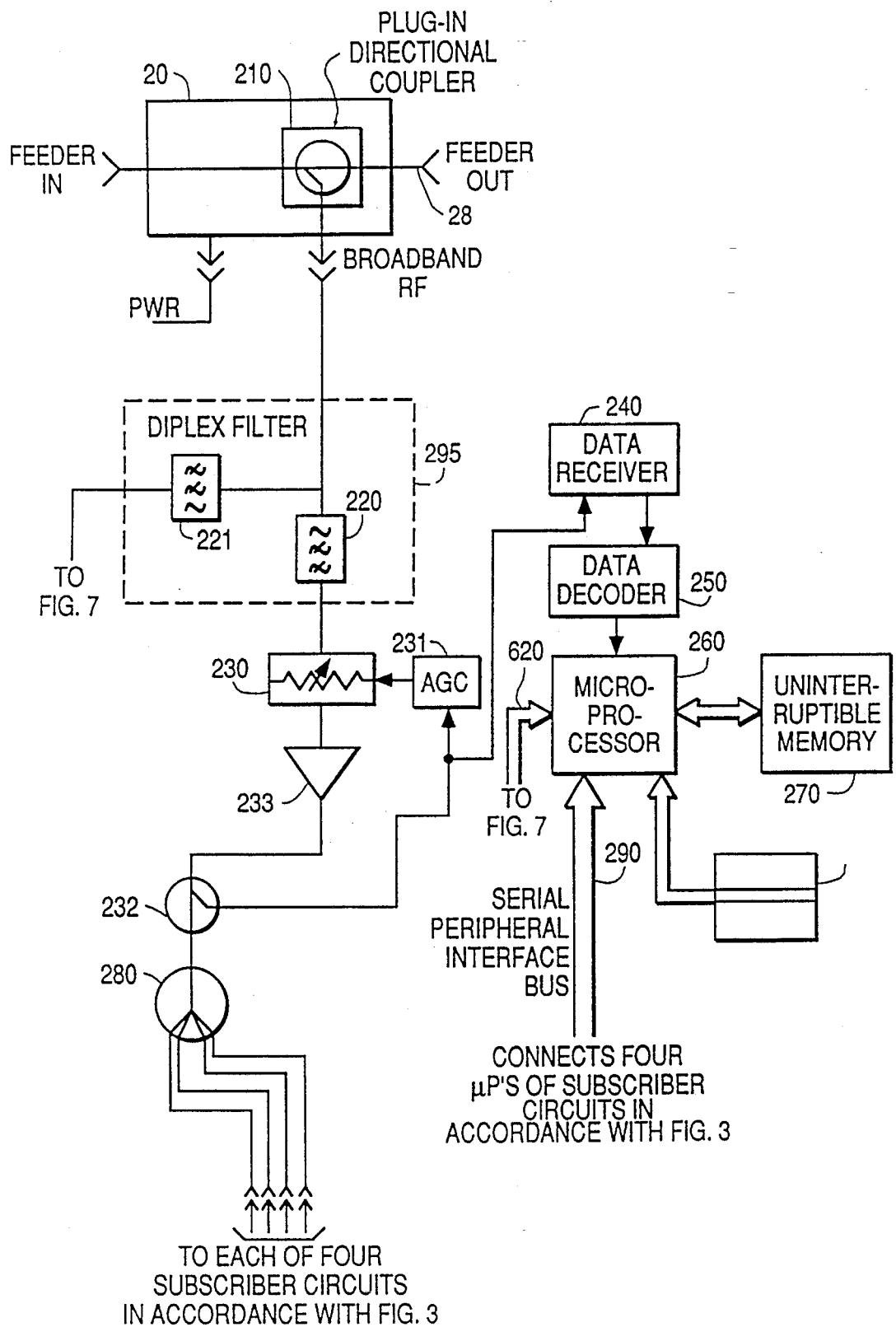
FIG. 2 is a block schematic diagram of an addressable common control circuit for a plurality of provided subscriber modules of an off-premises interdiction system as shown in FIG. 1 comprising a broadband signal tap, a diplexer connected to the tap, a microprocessor, uninterruptible memory, a data receiver, a data decoder, and an automatic gain control circuit.

The common control circuitry of interdiction apparatus 20 will now be described with reference to the block diagram FIG. 2 for serving four subscriber modules in accordance with the block diagram FIG. 3. Referring particularly to FIG. 2, feeder cable 28 is shown entering off-premises interdiction apparatus 20 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 210 which may be in the form of a plug-in module taps into the broadband serving cable 28. A broadband of radio frequency signals is thus output to highpass filter 220 of diplex filter 295. Highpass filter 220 passes a downstream band of frequencies, for example, 54–550 megahertz comprising at least the cable television spectrum and any separate data carrier frequency, such as 108.2 MHz, and blocks the upstream band of frequencies, for example, 5–30 megahertz (in a bi-directional application). For an off-premises interdiction system, the cable television spectrum may particularly comprise a narrower frequency band from about 54 MHz to 350 MHz or even a broader band of frequencies up to one gigahertz.

Lowpass or bandpass filter 221 passes at least the 0–30 MHz spectrum and more particularly a pass band comprising the T8 band from approximately 14–18 MHz. One of twenty-three data channels may be selected for upstream data transmission from within the T8 band to avoid noisy regions of the spectrum.

Circuitry associated with broadband signal "seizure" from the distribution cable 28 may be conveniently mounted on a single board, conveniently named a seizure board of interdiction apparatus 20, more particularly described in FIG. 15 of U.S. Pat. No. 4,963,966, but described in general terms herein as at least comprising the directional coupler 210 and diplex filter 295 of FIG. 2.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The common circuitry of FIG. 2 is collocated or closely located to the subscriber modules which will be further described in connection with FIG. 3.

Also connected to directional coupler 232 is a data receiver 240 for receiving downstream forward data transmissions from the addressable data transmitter 14 located at headend 10. Data receiver 240 receives data transmitted, for example, over a data earlier of 108.2 megahertz and provides unprocessed data to data decoder 250. In accordance with an established protocol and as will be further described herein in connection with FIG. 4, such data may be in the form of an operation code (command), a subscriber address and associated data. Data decoder 250 processes the address, Operation code and associated data and provides the separately transmitted address, operation code and data to microprocessor 260 for further interpretation in accordance with a stored control algorithm which will be described in greater detail herein in connection with FIGS. 6–8.

Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8 or other suitable microprocessor having internal random access memory and program memory. Microprocessor 260, in an alternative embodiment, may incorporate the functions of data decoder 250.

Received data may be stored in non-volatile or uninterruptable memory 270 by microprocessor 260. Free preview data, as will be described in conjunction with FIGS. 5 and 6, is typically stored in random access memory of microprocessor 260. An example of a service/event authorization memory portion of memory 270 will be subsequently described in connection with FIG. 4b. Data may be stored in memory 270 and jamming frequency control data downloaded when needed to a subscriber module according to FIG. 3 via a serial peripheral interface bus 290 connecting microprocessor 260 with separate microprocessors 300 associated with each provided subscriber module as shown in FIG. 3.

Furthermore, separate microprocessors 300 of each subscriber module may be replaced by an application specific integrated circuit which performs functions under control of microprocessor 260 as taught in U.S. application Ser. No. 07/896,292 and entitled "Interdiction Method and Apparatus with Programmable Jamming Effectiveness," filed concurrently herewith by the same assignee and incorporated as necessary by reference now U.S. Pat. No. 5,278,708. One exemplary application specific integrated circuit is the Scientific-Atlanta part no. 463563/463564 manufactured by AMI/Gould of Pocatello, Id.

Figure 6:
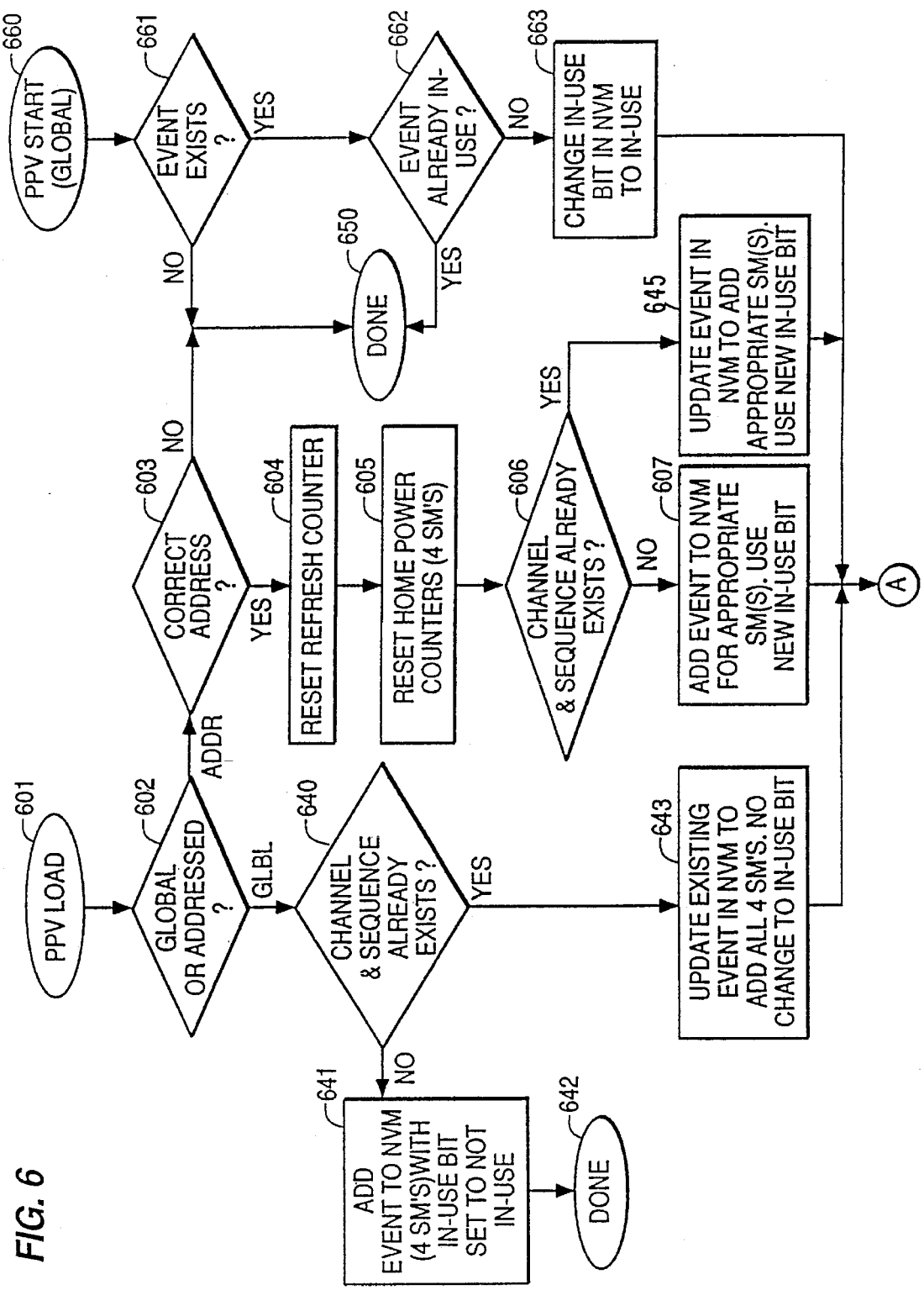
FIG. 6 is a partial flowchart of a method at service denial apparatus according to the present invention for providing periodic service showing controller activity upon reception of a first communication for loading memory with at least one new service code representing a particular periodic service offering and of a second communication at the initiation of a periodic service offering according to the present invention.
Figure 7:
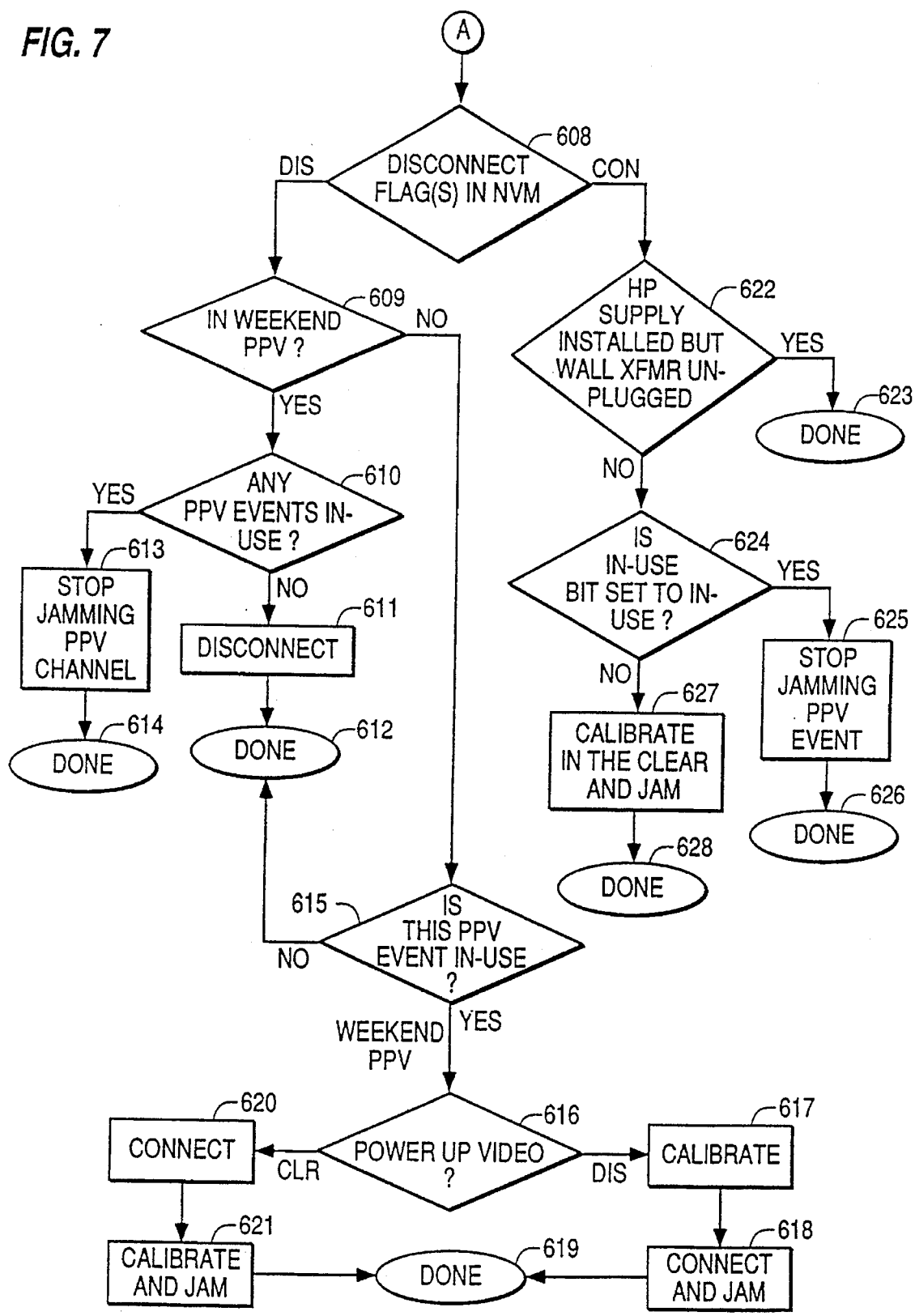
FIG. 7 is a remaining flowchart to be viewed in conjunction with FIG. 6 for service loading and service interval start communications according to the present invention.
Figure 8:
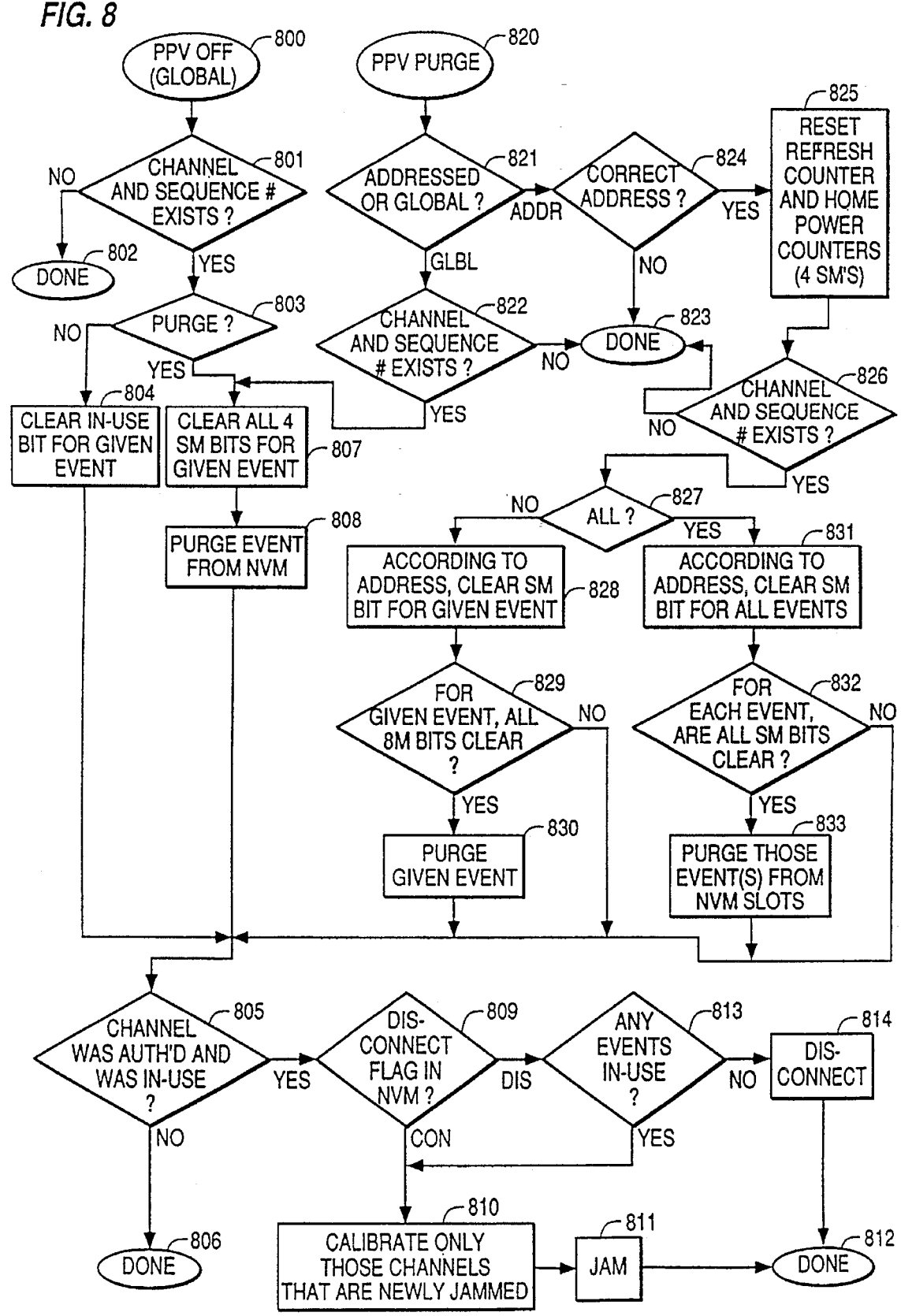
FIG. 8 is a flowchart of a method at service denial apparatus according to the present invention for terminating periodic service showing controller activity upon receipt of a third communication (for example, PPV Off or PPV Purge) for clearing a service status or so-called "in-use" bit from memory or for deleting the service from memory.

Variable attenuator 230 regulates the received broadband of picture carriers to a reference level while the microprocessor 260 controls the turning on and off of the respective jamming signal oscillators and the jamming carrier level outputs of associated subscriber units within the prescribed range. Microprocessor 260 consequently interprets global and group addressed communications addressed to common control circuitry or communications addressed to individual subscriber modules for operation of the subscriber modules such as subscriber service credit or service or event authorization commands or other subscriber specific data. If appropriate, microprocessor 260 ignores group addressed or subscriber addressed communications to other interdiction apparatus or to conventional converter/decoders. An example of global communications peculiar to interdiction apparatus 20 is premium channel frequency data for each premium channel or channel over which premium programming at a particular point in time is provided via headend 10. Other examples of global communications are the free preview load communication to be describe in conjunction with FIG. 5 and 9 and the pay-per-view event or periodic service start and off communications described herein in conjunction with FIGS. 6, 7 and 8. Examples of addressed communications to common control circuitry include communications comprising premium channel, pay-per-view event programming or periodic service authorization information or communications instructing the common control circuitry to provide pay-per-view credit to a particular subscriber. In accordance with the present invention, the pay-per-view event/periodic subscription service load communication described in connection with FIGS. 6, 7 and 8 is another example of what may be a specifically addressed communication (or may be global).

Serial peripheral interface buses 290, 620 may be a two way communications link by way of which microprocessors 300 (FIG. 3) or, alternatively, application specific integrated circuits may provide status reports to microprocessor 260 upon inquiry. Alternatively, a microprocessor of FIG. 3 may tap into a parallel contention-type bus 290 and bid for communication to either a microprocessor 260 of common equipment or another microprocessor 300 or application specific integrated circuit or may directly communicate with any of the other associated microprocessors over a separate serial bus 290.

Figure 3:
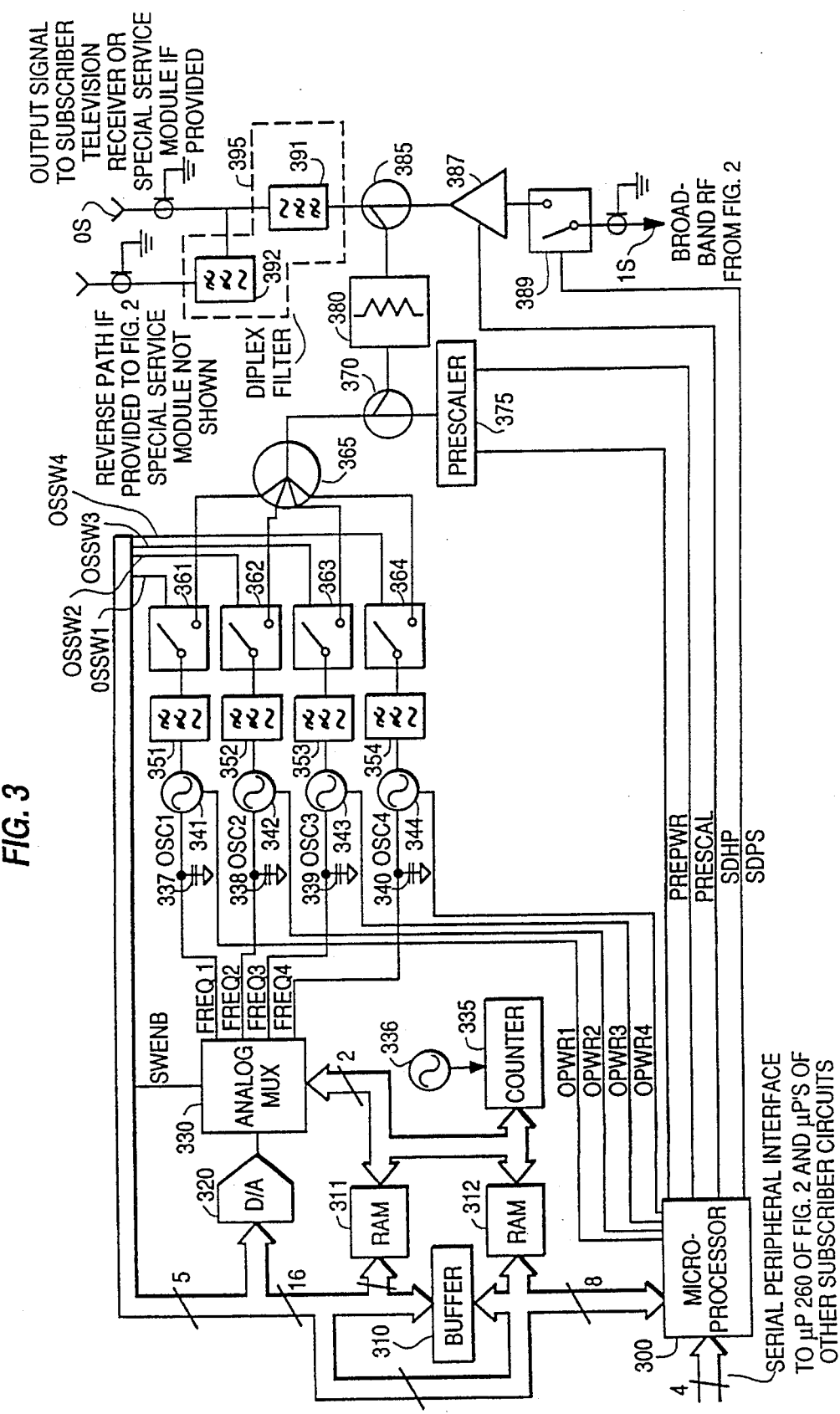
FIG. 3 is a block schematic diagram of one subscriber module of an off-premises interdiction system comprising a microprocessor 300 for selectively controlling the jamming of unauthorized services to a subscriber, a subscriber disconnect switch for disconnecting service under microprocessor control, associated jamming signal generating equipment and a diplexer.

Radio frequency splitter 280 provides broadband radio frequency signals comprising a broadband subscription television service spectrum separately to each subscriber module according to FIG. 3 that is provided.

FIG. 3 is an overall block schematic diagram of a subscriber module of interdiction apparatus 20 including a diplex filter 395. A microprocessor 300 or alternatively an application specific integrated circuit is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 260. Consequently, microprocessor 300 may conveniently comprise a Motorola 68HC05C3 microprocessor or similar unit.

In the alternative embodiment involving an application specific integrated circuit, microprocessor 260 may assume all the control tasks of microprocessor 300 and microprocessors 300 may be replaced. Furthermore, functions of analog mux 330, D/A converter 320, RAM's, buffers and prescaler 375 may all be incorporated or rearranged depending on the characteristics included within an application specific integrated circuit. For example, there may be provided four individual D/A converters, one for each oscillator which subsume the function of the analog MUX 330. In this embodiment, the application specific integrated circuit controls each D/A converter separately.

A 5–30 megahertz or other lowpass band, more particularly, a 0–15 MHz lowpass band, may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, a radio frequency amplifier 387, a jamming signal combiner 385, and a high pass filter 391.

Service denying switch 389 is under control of microprocessor 300. In the event of an addressed communication from headend 10 indicating, for example, that a subscriber is to be denied service for non-payment of a bill, service denying switch 389 may be opened, disconnecting service. In connection with the present invention, the switch 389 is periodically closed and then opened during scheduled periods of an authorized periodic service offering subscribed to by a particular subscriber. In addition or in the alternative, a high frequency amplifier 387 may be powered down under control of microprocessor 387 whenever service is to be denied. Otherwise or even in addition, amplifier 387 may be set at discrete gain levels, under microprocessor control, to provide supplemental gain to the broadband television signal if a subscriber has a plurality of television receivers (TV's and VCR's) over and above a nominal amount. Furthermore, amplifier 387 may comprise adjustable bandpass filter circuits under microprocessor control for selectably limiting service bandwidth to a subscriber.

In an alternative embodiment not shown, all subscriber jamming signal generating equipment, for example, signal generating equipment 341–344, may be replaced by a programmable bandpass filter 391 which under control of microprocessor 260 provides a limited bandwidth of signals to the subscriber depending on the subscriber's selected periodic service offering.

An appropriate control signal waveform output SDPS is provided by microprocessor 260 or by microprocessor 300 for controlling switch 389. Also the same ON/OFF control signal that is used to control the switch 389 may control the powering up and down of amplifier 387 as control signal SDHP. The status of the connect/disconnect condition of switch 389 is conveniently preserved in memory of microprocessor 260 or, alternatively, microprocessor 300. Furthermore, the intended state of switch 389 is conveniently preserved in non-volatile or non-interruptible memory 270 of microprocessor 260. For example, if a particular subscriber is a subscriber to a regular service offering, the intended state of switch 389 or related denial circuits is to be always closed or connected. However, the normal state for the condition of switch 389 of a periodic service subscriber is open or disconnected.

Continuing the discussion of FIG. 3, jamming signals are interdicted at directional combiner 385 under microprocessor control. Because of the directional characteristic of radio frequency amplifier 387, jamming signals cannot inadvertently reach the common control circuitry of FIG. 2 or the serving cable. Highpass filter 391 of diplex filter 395 prevents any return path signals from reaching combiner 385 and passes the broadband spectrum including any jamming signals toward terminal OS. Reverse path signals, for example, in this embodiment may be radio frequency signals below 30 megahertz. The broadband television spectrum is presumed to be in the 50–550 megahertz range. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300 or the substitute application specific integrated circuit, responsive to common microprocessor 260, controls the frequency and power level outputs of four (or five if necessary) voltage controlled oscillators 341–344, each of which oscillators jams premium channel frequencies within an allocated continuous range of frequencies. The frequency of the oscillators is set over leads FREQ 1–4 in accordance with a calibration procedure and in a manner described in U.S. Pat. 4,912,760. A power level and ON/OFF operation of the oscillators 341–344 are controlled over leads OPWR1–4.

Since premium programming may be transmitted anywhere within the cable television spectrum, the sum of all such allocated portions comprises the entire television spectrum to be jammed. Also, in accordance with the depicted interdiction system, the television spectrum to be jammed may comprise discontinuous portions or intentionally overlapping portions.

A further detailed discussion of frequency control and the interdiction system of FIGS. 1, 2, and 3 may be found in U.S. application Ser. No. 279,619, filed Dec. 5, 1988, now U.S. Pat. No. 5,014,309 also incorporated herein by reference.

Now, the method and apparatus for providing a periodic subscription service will be described in detail in view of FIGS. 1–8 making reference to apparatus, data communicated or stored in the apparatus and method steps having reference numerals which have been consistently used throughout the drawings to identify corresponding elements.

Figure 4A:
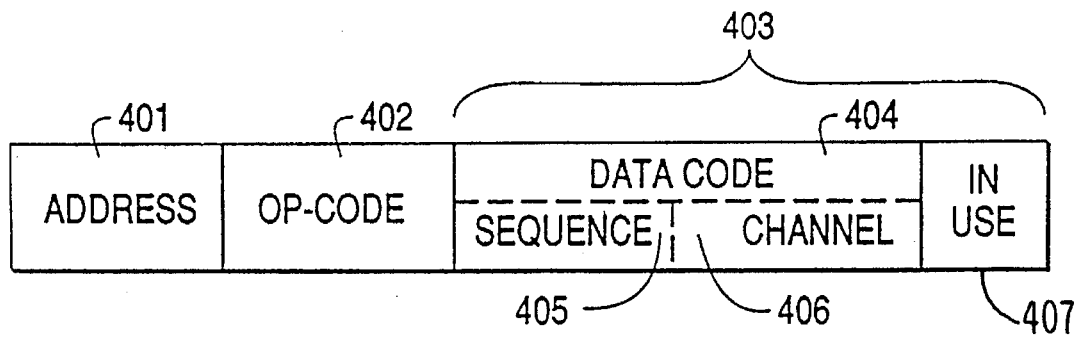
FIGS. 4a and 4b are diagrams showing representative data for storage in memory or for communication between a headend and service denial apparatus according to the present invention.

Referring now to FIG. 4a, a typical communication from a headend 10 to service denial apparatus according to the present invention comprises an address 401, a command or operation code (Op-Code) 402 and data 403. The order shown in FIG. 4a for elements 401, 402 and 403 of the depicted exemplary communication is merely a suggested order and may be varied depending on the system chosen and its particular protocol. Nevertheless, the order shown is typical of such addressed communications and may comprise additional elements not shown. In particular, data 403 comprises a data code 404 and, in the context of a service or event code communication, may comprise an in-use or status bit 407. The in-use bit defines whether the service or event is in-use or on or is not in-use or is off.

In prior art pay-per-view systems, a block of data 403 is allocated to particularly identify a pay-per-view program or event. Such a block may comprise from 10 to 32 bits of data which may be encoded to secure the data from understanding by a service pirate. In alternative embodiments, the entire communication may be encoded or encrypted so as to, for example, interleave or scramble data bits for each element 401,402,403 to render the communication secure from pirates.

To define a pay-per-view program to be different from another pay-per-view program, one designing such data 403 must take into consideration what data must be included within the data block. In particular, data code 404 may particularly represent at least a premium channel number. Since the number of channels provided in subscription television services may be in the hundreds, a sufficiently large data block must be allocated to a channel number 406, for example, from six to twenty bits of data.

Recognizing that a pay-per-view program or event may be periodically deauthorized, its event code 404 is removed from memory and each event has a finite duration. Other data, referred to herein as sequence data 405, is used to signify its scheduled start time, stop time and thereby, in conjunction with the channel data 406, the event as differentiated from any other event stored in memory. Thus, the sequence data may comprise from four to twelve bits of data.

Sequence data 405 and channel data 406, and even in-use bit 407 if used, may be encoded together as data block 404 or 403 and, while transmitted together, may not be separately identifiable to a service pirate. Furthermore, there may be considerable redundancy allowed within any one or all of the block of data 405, the block of data 404 or the block of data 403 for inclusion of additional data.

In providing a periodic subscription service, no channel number or channel data 406 normally used in pay-per-view service need be provided or stored. An absence of channel data may signal service denial apparatus to provide service on all regular service channels and deny service on all premium channels. Furthermore, using redundant data of the block representing data code 404, a periodic service code may be designed to signal authorization of all regular service channels, a portion of the channels of a regular service offering or premium channels or combinations of these.

Typically in subscription television systems, the channel numbers for regular services are low and together comprise the lower portion of a transmitted broadband of frequencies. The lower the channel number the less amount of data required to specify the regular service channel. To the contrary, premium channels typically have high numbers and, thus, may represent the higher portion of the transmitted broadband spectrum. Thus, considerable redundancy is available in most existent systems for channel data 406. Consequently, in connection with transmitting periodic service data, there is an opportunity to use non-used channel data for transmission of a plurality of channel numbers for either authorized channels or non-authorized channels because the channel numbers are typically low numbers and represent regular service channels.

Data bit positions within any provided channel data 406 within a particular service data code 404, additionally, may be used to identify the inclusion of such channels in a service allocation, for example, as to whether they comprise a subset of channels to be authorized or a subset of channels to be subtracted from those comprising a regular service offering. One bit position is used as a sign bit to signal the subtraction or addition of the channels represented by the provided channel data.

Should there be insufficient bit capacity in a typical communication for a particular subscription television system providing pay-per-view services for periodic service authorization, then, two or more communications may be transmitted, for example, serially from headend 10 via data transmitter 14 to first, for example, load a service data code 403 into memory 270 for weekend access to all regular service channels and, additionally, in the following serial communication, add one or more premium channels. Consequently, in accordance with the present invention, plural service codes 403 may be provided to define for their service life a plurality of periodic services each involving a plurality of distinct or overlapping channel offerings. It is important to note again that no addressed premium channel authorization communication is assumed in periodic service authorization of a periodic service subscriber, and their premium channel authorization map is preferably empty.

In the context of the present invention, there is no change in consideration or design of the address data 401 or operation codes 402. For example, the same operation code representing the loading of a pay-per-view event into memory 270 is used for loading a periodic service code according to the present invention.

In the context of the present invention, however, the status bit 407 used to identify the in-use status of a program or event on a predetermined premium channel relates, in stead, to the provision of a periodic service represented by service data code 403. In other words, the in-use bit for periodic service represents whether or not the periodic service is in-use or temporarily off. Furthermore, when the in-use bit is off and another event code is still on or in-use, the periodic service subscriber will continue to be connected until their event code is off.

In accordance with FIG. 4a, there are several such communications initiated in connection with establishing a periodic subscription service. The most important of these will be described in the following descriptions of FIGS. 6–8. Yet, there are several preliminary communications automatically initiated by system manager computer 16.

Since it is already assumed that there exists equipment in place to serve a new potential subscriber to periodic service, then, it is further assumed that a number of communications are already automatically initiated and scheduled via the system manager computer 16. These include, but are not limited to include, a global time of day communication for refreshing the time of day stored in service denial memory for a local time of day clock. Such a communication has at least an opcode 402 and data 403. There is also a global or addressed frequencies communication for assigning frequencies to slots. As described in U.S. Pat. No. 4,912,760, some premium channels may be jammed more frequently and jamming factors established under headend control. There is a global or addressed channel to slot map communication which assigns channels to slots. These communications together load memory 270 with channel, frequency and slot information so that the service denial apparatus of FIGS. 2 and 3 may determine how to actuate its jamming signal generation equipment to jam unauthorized channels.

Other assumed communications not covered herein in detail include a global or addressed security parameters communication related to protecting the housing 56 and service from pirates. Also, there are interdiction parameters communications for general purpose configuration of the interdiction equipment.

As will be described in connection with FIG. 5, a global preview communication is initiated via a preview transaction with the system manager computer 16 to globally authorize all interdiction equipment served customers to receive normally unauthorized premium channels. The preview transaction when received in memory for a periodic service subscriber comprises time periods which may conflict with time periods for periodic service. Consequently, software resident in program memory, as described further in conjunction with FIGS. 6, 7 and 8, must include conflict resolution steps which resolve, for example, in the instance of an overlap in times or when the schedule for a free preview and periodic service, whether the periodic service subscriber is to receive signal during the overlap on the free preview channel of during periods when service is disconnected. According to the present invention, the service code controls, and so long as the periodic service is in-use, the free preview may be watched. In particular, these previews are viewable by a periodic service subscriber so long as their disconnect switch 289 is in its connect state.

There is also an addressed communication generally not used during periodic service authorization for authorizing premium channels. During regular service subscription, a user of computer 16 initiates a transaction for scheduling an addressed communication from the headend for causing an authorized premium channel map to be stored in memory 270 associated with a premium channel subscriber. When this communication is received, typically, a non-volatile memory map is updated to reflect the current premium channel authorizations for a subscriber. Once the channel map is received, a calibration of jamming signal oscillators is performed for all frequencies currently not authorized.

Firstly, there must be a frequency stored for the authorization channel in a frequency memory look-up table as loaded per the above-described frequency load communication. Further, if the channel has a PPV event code or periodic service code in use, then, that channel is not jammed until the event or service has its in-use bit cleared. Finally, the memory map for the free preview is regarded to determine if a preview is in progress. Not until the preview timer is cleared will access to the channel be denied to the user.

All of these communications comprise the format shown in FIG. 4a, the global communication having no specific or group address, but, nevertheless, having an opcode 402 and data 403.

Figure 5:
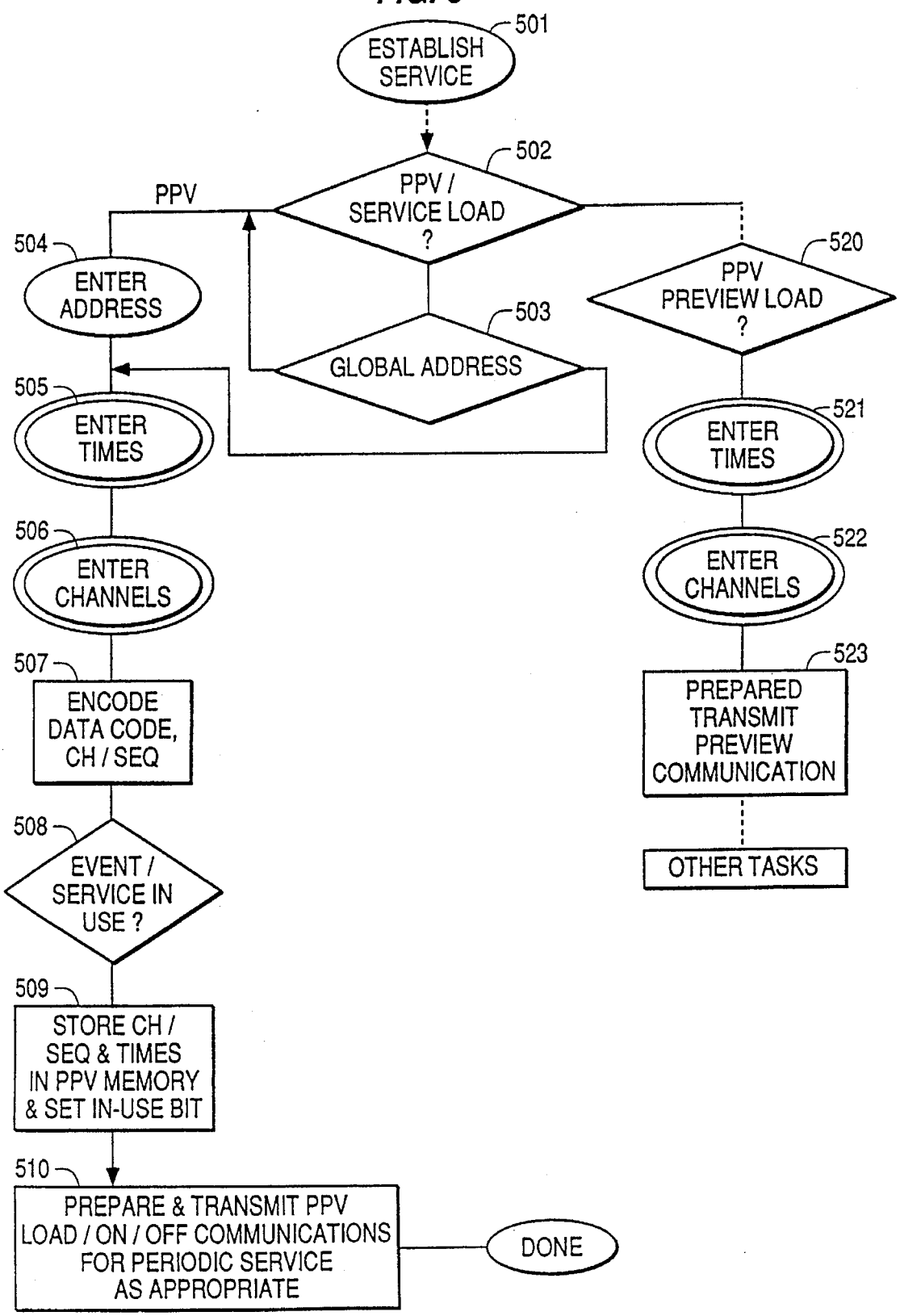
FIG. 5 is a flowchart of a method for use at a system controller location for allocating a plurality of channels associated with a particular periodic subscription service offering according to the present invention.

Briefly described, the periodic service authorization communications comprise three normally related pay-per-view communications initiated via the system manager computer 16 as will be further described also in connection with FIG. 5. The user of the system manager computer 16 may be presented with a plurality of screen displays from which the user inputs a particular periodic service offering or selects an existent offering which is automatically encoded into a particular service code 404 as already described above in connection with FIG. 4a. Upon receipt at service denial apparatus, the subscribers' PPV event and service code data of memory 270 is searched to determine if the pay-per-view event or periodic service offering is already loaded in memory 270. If so, no action is taken. If the event or service code is not already loaded, the controller 260 actuates a random selection of a memory address and loads the event or service code into the selected address. In the selection process, an address from all available addresses may be picked at random and the next empty slot thereafter used for storage of the event or service code. In this manner, excessive writing of data codes to low numbered addresses is prevented.

Furthermore, the in-use bit may be toggled depending on whether the communication is globally or specifically addressed. Preferably, in an addressed communication, the in-use bit is set depending on whether the service or event is currently in progress in accordance with the transmitted data. Also, the communication may be transmitted to the group of subscribers associated with a housing 56.

At the time of commencement of a periodic service interval or of a pay-per-view event, the pay-per-view event or service map is updated via a global second communication from the headend 10 signaling the start of the event or service. A search is made of the event and service map in memory 270 to determine if the event has already been loaded. If there is a match between one of the event or service codes in memory and the event or service code transmitted with the global communication, then, the in-use bit is set to in-use and the allocated channels authorized in accordance with the contents of the data code.

At the time of conclusion of a periodic service interval or of a pay-per-view event, there is an automatic global third communication transmitted from the headend 10 to update the pay-per-view or periodic service map. Typically, a pay-per-view event is purged or erased from memory altogether. On the other hand, a periodic service subscriber will retain the service code in memory. The service off command simply changes the status of an in-use bit from on to off and disconnects the subscriber.

Conflicts, however, can, as already suggested above, arise between the periodic service subscriber and their purchase of a pay-per-view event. As will be described in detail herein, conflict resolution means exists for permitting the periodic service subscriber to continue to view a pay-per-view event despite the intended status recorded in memory of the subscriber disconnect switch 289. At the conclusion of periodic service, the periodic service subscriber is permitted to continue to receive signal on the premium pay-per-view channel only. All other channels allocated to the periodic service offering may be selectively jammed or may be authorized for extended viewing until the end of the pay-per-view event.

There are other communications from a headend to apparatus not covered herein which relate to service maintenance and other such matters only peripherally related to periodic service according to the present invention. Furthermore, a periodic service subscriber, equipped with appropriate apparatus, may generate communications to the headend or to other subscribers, which communications may only be peripherally related to periodic services according to the present invention. For example, a new periodic service subscriber equipped with upstream communications apparatus may signal their purchase of periodic service to the headend.

Now, referring to FIG. 4b, the portion of memory 270 for storing event code or service code data will be described in greater detail. The depicted memory portion is exemplary only and may be in any order in data memory. For example, the sequence data 414 may, reading left to right, precede the in-use channel bit 411 which in turn may precede the channel data 413. Upon receipt, for example, of an addressed first PPV load communication, the memory portion shown in FIG. 4b of memory 270 is regarded on an address by address basis for the downloaded event or service code data. Bit positions S1–S4 separately identify one of four or more subscriber modules representing a subscriber. These subscriber related bits 410 are regarded to determine if the addressed subscriber bit in combination with a stored apparatus address match the transmitted address for the periodic service subscriber. If so, then, the data codes 412 are matched with the transmitted data codes 404. If there is no match, or this is a new subscriber, the new data code is loaded as one subscriber's data code 4 12 which, for example, identifies a particular periodic service offering. If the periodic service offering is a weekend service offering and the subscriber orders the service over the weekend, then, the status bit 411 is set to in-use according to the status bit 407 in the transmitted communication.

Figure 4B:
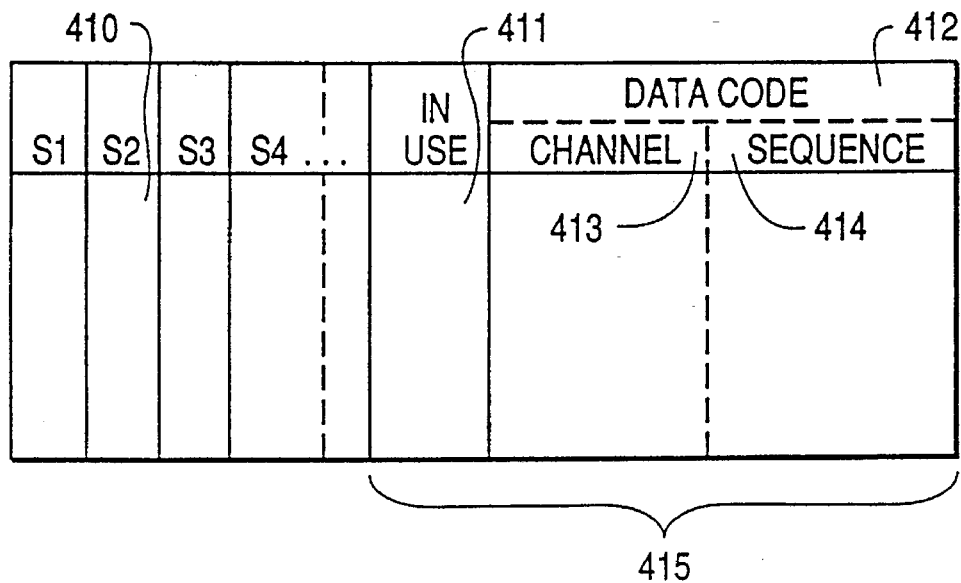

The data in the pay-per-view event or periodic service memory according to FIG. 4b are updated as appropriate upon receipt of the communications described in greater detail in view of FIGS. 6–8.

Now referring to FIG. 5, the method of authorizing service to a new periodic service subscriber will be even more fully described. At box 501 upon the inquiry of a new potential subscriber to periodic subscription service, a system operator must utilize their system manager computer 16 to access certain subscriber records typically recorded in non-volatile memory. Using the address of the new subscriber, the software for computer 16 simply performs a subscriber record look-up which provides data for the system operator regarding equipment and service status. Furthermore, via an interface with billing computer 18, the system manager computer 16 may provide a visual indication of billing records as well.

For the purposes of the present invention in regard to equipment status, it may be assumed that a housing 56 is already in place and equipped with subscriber modules according to FIG. 3 including a module already connectable to a drop to the new subscriber's premises 66 via a subscriber disconnect switch 389 or other disconnect device. It may be further assumed that the state of the switch 389 or other disconnect device is in its open or disconnect state and, consequently, the subscriber receives no signal from the service provider via drop 66.

Referring still to box 501, the user of the computer is typically presented eventually with a set of on-screen display windows for initiating certain tasks. Box 501 for establishing service also represents such a menu selection for initiating a pay-per-view or periodic service related set of on-screen displays from which various selections are made or data entered after the periodic service subscriber's billing information has been entered.

Box 502 represents a choice made by the user to select an event or service code establishment process for a PPV event which is global or addressed or a service code load which is normally addressed but may be global.

Box 503 represents a selection thereafter for an event whether to establish the event or service in memory of all subscribers, but not activate it yet. If the service/event load is to be global, then box 505 is entered directly bypassing any request for subscriber address data. If, for example, the subscriber is to be addressed directly, then, box 504 is entered. If the subscriber's location address is known and this is a new subscriber, equipment and service table data may be recovered at box 504 if not already recovered at box 501 by menu selection and, if necessary, billing computer 18 accessed to enter a new subscriber or check old subscriber records.

Generally, the system manager computer 16, if equipment is in position but not connected, may automatically associate the location address entered with an equipment address. Consequently, the system manager is in a position to retrieve and encode, as necessary, address element 401 of any communication which it initiates.

At box 505, the user of the system manager computer 16 enters event or service times respectively for the requested service or pay-per-view event, if the event or service has not already been established. Already established pay-per-view events and services may be simply looked-up and displayed from memory of computer 16. The user then simply associates the new subscriber with the already established service or event.

At box 506, the user of the system manager computer 16 is requested and so inputs data regarding the premium channel for the purchased event and/or the regular or other allocated channels for the requested periodic service offering, if not already predetermined. At box 507, the system manager computer generates one or more event or service data codes 404.

At box 508, the system manager computer compares the entered service or event times with the actual real time of the system clock to determine the status of the In-Use bit 407. Furthermore, the user of the system manager computer 16 may force the status to be "on", if appropriate.

At box 509, the system manager computer continues to encode communication data elements as appropriate and stores associated times and periodic service intervals in memory of computer 16 with the encoded event or service data along with the in-use bit in its predetermined position.

At box 510, and, as soon as possible after all necessary data is entered and the subscriber billing established, the system manager actuates the addressable transmitter 14 (or alternatively an in-band controller not shown) to transmit a first communication for pay-per-view event or periodic service code loading of subscriber memory 270, all other programmed communications described or suggested above being likewise scheduled and presumed except addressed premium channel authorization communication. As described above, the premium channel authorization command is used in connection with authorizing premium channels for a regular service subscriber, not a periodic service subscriber.

Addressable transmitter 14 queues communications according to FIG. 4 for transmittal at, for example, a data rate of 19.2 kilobits per second. Transmitter 14 actuates transmittals at appropriate hours upon control of system manager computer 14. For example, there may be hundreds of communications scheduled for delivery to all subscriber-serving apparatus at a particular time of day. Examples of such communications are the PPV event/service start or off communications whose receipt at subscriber apparatus is described by FIGS. 6–8. Thus, at appropriate times, the global second PPV event On and global third Off or purge communications are transmitted via addressable transmitter 14 or the in-band controller to service denial apparatus 56 via a data carrier of, for example, 108.2 MHz.

Now referring to boxes 520–523, a user may select a menu path at system manager computer 16 leading to the establishment of a free preview. A global pay-per-view event load communication 8 loads a bit map for globally authorized channels. The bit map, for example, may be stored in memory 270 or, preferably, volatile RAM of microprocessor 260. The free preview is intended as a sneak free preview for a pay-per-view event for a short portion of the event itself. Nonetheless, some system operators have employed the preview as a means for providing a premium channel for free for a long period of time as an incentive for regular subscribers to subscribe to the premium channel.

The transactions described by boxes 520–523 are important to the present invention in that a channel is authorized for receipt of the free preview if the corresponding preview bit is set in preview memory. The communication authorizes a channel despite the authorized or non-authorized status of a premium channel in an individual subscriber authorization memory, which in the instance of a periodic service subscriber contains no authorizations.

During the PPV service establishment process, there is thus provided at least an on-screen display menu for establishing a free preview enterable at box 520. The pay-per-view preview transaction with system manager computer 16 is used to globally establish a timer in memory 270 of subscriber equipment to provide free access time to a normally unauthorized channel. At box 520, a series of preview load transactions is accessed at system manager 16. At box 521, the event start time, if not already entered, is entered as is the duration of the free service. At box 522, the premium channels for free service are entered. Thereafter, a globally addressed preview communication is formed comprising at least an operation code 402, channel data 406, and data representing a free preview time interval. Upon receipt of a PPV event or service code start command and if the channels match the channels for the free preview, a regular or periodic service subscriber is permitted to watch the free preview until a preview timer expires whose duration is predetermined by the preview communication.

Now referring to FIG. 9, the receipt of a preview communication at service denial apparatus will be described. At box 901, the opcode representing a send preview communication is recognized and the flowchart represented by FIG. 9 entered. The subsequent boxes 902–912 may be looped through periodically by microprocessor 260. Consequently, box 902 represents a periodic look at whether a preview communication has been received or whether a pay-per-view counter or timer has counted down. In other words, this point in the program has been reached, not from box 901, but from box 907, 908 or 909.

If a preview communication has just been received, box 903 is entered. At box 903, a preview map, stored typically in random access memory of microprocessor 260, is updated to reflect new free previews. At box 904, if the preview has started, for example, a PPV event start command is received in the interim, the controller stops jamming new preview channels as needed. Depending on whether any free previews have ended, i.e. a counter will count down of timer intervals at box 905, then, either box 906 or box 907 is entered.

In the depicted embodiment for a preview, there exist in microprocessor RAM two essential elements, a timer and a counter. The timer times a predetermined interval which may be from one to twenty minutes in duration and is preferably 8.8 minutes. The counter counts how many of such intervals are to be allowed for a particular preview. Consequently, at box 907, the timer is started or restarted as appropriate for the predetermined time period of the timer.

At box 905, if any preview events have ended, then, box 906 is entered. Box 906 represents a jamming oscillator calibration process which is performed for only those premium channels that are newly jammed, that is, those on which the preview events have ended. Then, box 607 for the timer is entered and the timer restarted.

Now if, at box 902, this is a cyclic entry from boxes 907, 908 or 909, then box 908 is entered from box 902. At box 908, the preview counter for the preview event is regarded to determine if it has expired, i.e. is equal to 0. If yes, then, box 902 is entered. If not, then, box 909 is entered for checking the timer. If the timer has expired and equals the predetermined interval of, for example, 8.8 minutes then box 910 is reentered. Otherwise, control returns to box 902.

At box 910, because the timer has expired, the preview count of the counter is decremented by one count for each preview event. Then, box 911 is entered. If the preview counter for a preview event has expired, then, at box 912, the preview map in RAM is cleared of that preview event and box 906 is entered.

If the preview counter is not zero at box 911, then, box 907 is entered and eventually box 902. Eventually, the preview event map in RAM will empty as preview events time out if no new preview events are loaded via box 901.

Figure 9:
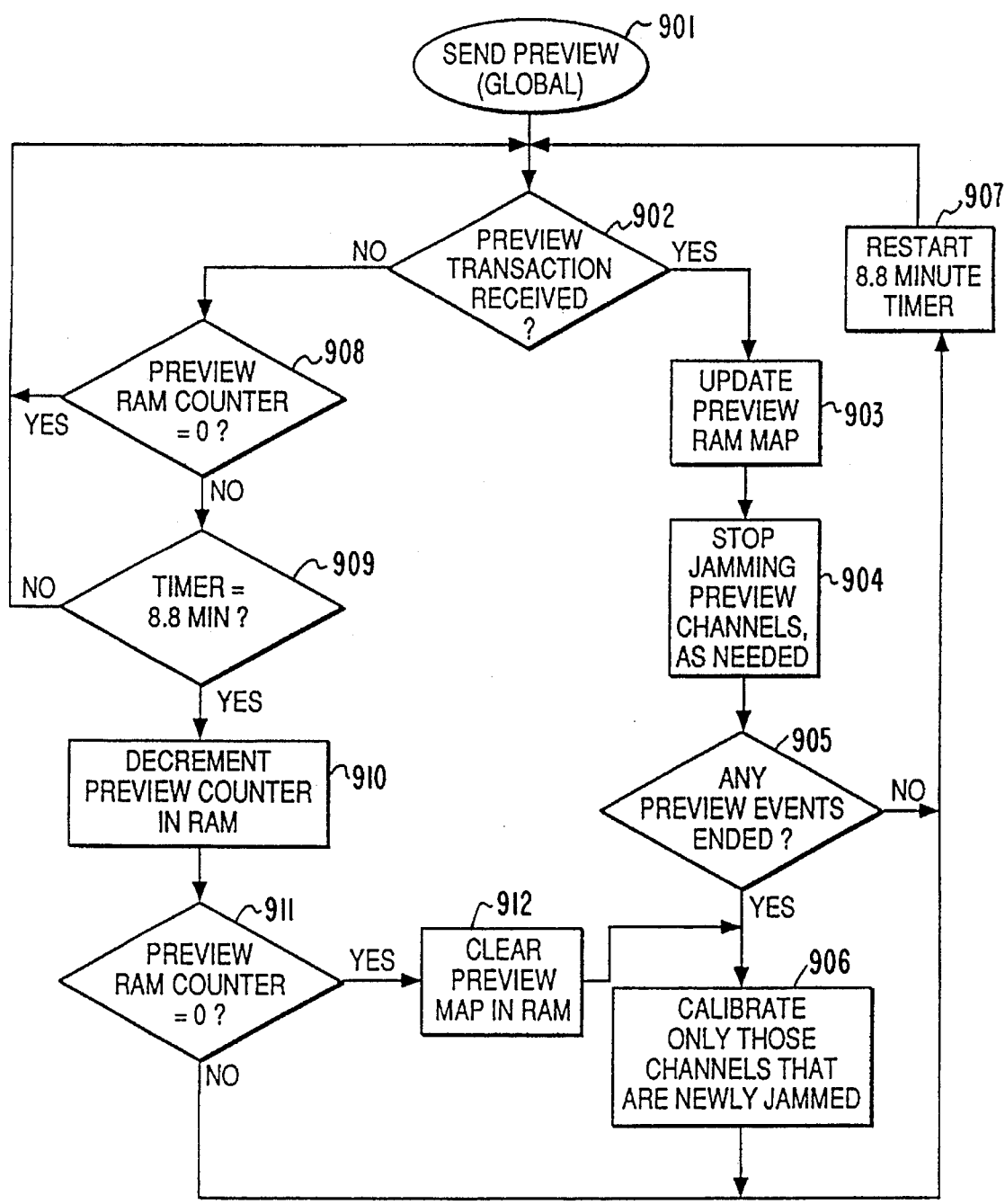
FIG. 9 is a flowchart of a method at service denial apparatus according to the present invention for providing a free preview of premium programs (for example, pay-per-view events) during periodic service, showing controller activity upon receipt of a communication for loading memory with premium program preview data and initiating a counter for counting a free preview interval.

The preview process according to FIG. 9 controls service denial apparatus jamming or interdiction apparatus but provides no control of a service denial device such as switch 389. Consequently, any time a device such as device 389 is closed (or in its service connect position), then, a periodic service subscriber will be able to receive free previews on premium channels.

FIGS. 6, 7 and 8 describe controller 260 operations upon receipt of a global or addressed first communication loading and so authorizing a periodic service (or PPV event) and signaling via global second and third communications the periodic beginning and end of an associated periodic service interval (or pay-per-view event).

Referring first to FIG. 6, the receipt of a global or addressed first pay-per-view load communication will be described. Controller 260 first regards the operation code data of the received communication to determine which path to follow of FIGS. 6, 7 or 8. If the operation code relates to an event or service code loading communication then box 601 is entered.

At box 602, the address data, if present, is regarded to determine if the communication is global, group addressed or specifically addressed. If there is an address match between either a group or subscriber address at box 603 then, the path through flowcharts of FIGS. 6 and 7 via box 604 is followed. If the received communication is global, then the path via box 640 is followed.

First assuming that the communication received at service denial apparatus is addressed at box 602 and there is a match attempted with any address for service denial apparatus 56, then an address match with an address for housing 56 or for one of a number such as four provided subscriber modules is determined. If there is no match with either such address, then the entire communication is ignored at box 650, and the controller 260 is done.

On the other hand if the housing 56 is addressed, a refresh counter to thwart pirates is refreshed at box 604. Further, if the particular subscriber module is addressed, then, a home power counter for a subscriber that is equipped with a home power supply transformer for the service denial apparatus is reset at box 605. This resetting of a home power counter is to thwart subscribers who by repeatedly removing power reset volatile memory of apparatus 56 and thereby may obtain free unauthorized service. The refresh counter similarly relates to signal piracy; i.e. the refresh counter can prevent a subscriber apparatus from interfering with receipt of a service disconnect signal. Further details of the refresh counter and home power counter are provided in U.S. Pat. No. 5,243,651 entitled "Diagnostic Method and Apparatus for a Cable Television Interdiction System," of Parikh et al. filed Jun. 10, 1992 and incorporated as necessary as to essential subject matter by reference. As described therein, the service denial apparatus of the invention may signal counter violation by repeatedly alternating an unjammed signal and a jammed signal on all channels on a prescheduled basis corresponding to the diagnostic mode for the counter violated.

At box 606, the received event or service code data 404 is regarded and is compared for the given subscriber S1, S2, S3, S4 or SN or group of four subscribers S1–S4(ND to determine if the service/event data 412 already exists in service/event data memory per FIG. 4b. Channel and sequence data referred to in the flowcharts represent sequence data 405 and channel data 406 of data code 404 of FIG. 4 received with any of the three communications, receipt of which is described by FIGS. 6–8. If the event/service code 412 exists (which, likewise, comprises channel data 413 and/or sequence data 414), then, at box 645, the event/service authorization data is updated for any previously unauthorized subscribers 410 to reflect the current communication data. Also, for the subscribers S1–SN 410, the new in-use code transmitted with the communication is set in memory as bit 411 in accordance with transmitted in-use bit 407.

If this is a new service/event data code 404 at box 606, that is, the channel/sequence data does not exist in memory per FIG. 4b, then, box 607 is entered. Box 607 represents the controller 260 tasks of adding the event/service code data 412 into memory of FIG. 4b and setting bits for each authorized subscriber 410 as well as setting the in-use bit 411 according to any received in-use bit.

On the other hand, if, at box 606, the event exists in memory, then, the received addressed subscriber data 410 is updated for the event data 412 in memory and the status of the in-use bit 411 is also updated per the received in-use bit 407 at box 645.

If the received pay-per-view load communication is global at box 602, then, the service/event data 412 in memory of FIG. 4b is regarded to determine if the transmitted data code 404 is already present at box 640. If not, then, box 641 is entered. The service/event data 412 is added to the memory of FIG. 4b for all four subscribers (since the communication was global) and the in-use bit is intentionally set to not-in-use. The controller is then done at box 642 with a global event/service code load communication. In other words, the global load simply loads an event/service code for all subscribers without setting its in-use bit to on.

If the data code 412 already exists in memory at box 640, then, box 643 is entered. At box 643, subscriber data 410 is updated for all four subscribers to show their authorization, because this is a global command. On the other hand, there may be no provision for an in-use bit in a global PPV load communication, and so there is no change to the in-use bit.

Nothing in FIG. 6 relates to connecting or disconnecting service or to jamming or unjamming premium channels. FIG. 6 represents memory changes actuated upon receipt of either a PPV load or PPV Start opcoded communication. FIG. 7, on the other hand, controls provision of service to a periodic service subscriber and authorization of premium channel reception to a regular service subscriber by appropriate changes to the states of service denial devices such as switches 389 or by activating and deactivating premium channel jamming signal generators 341–344.

Referring now to FIG. 7, control from any of boxes 607, 643, 645 or even 663 to be described subsequently herein is transferred to box 608. At box 608 the status of disconnect flags for each subscriber which represent the intended status of service denial devices such as switches 389 for all subscribers are regarded. As described earlier, a normally disconnect state is stored for periodic subscribers. Thus, if the status for a particular subscriber is disconnect, box 609 is entered.

At box 609, weekend or other periodic service is determined because the sensed state of the disconnect switch should be closed during a periodic service interval at microprocessor 260 and stored in random access memory thereof. Then, if this is periodic service, box 610 is entered to determine if there are any paid-for pay-per-view events in-use, i.e. there exists authorized events and the in-use bit is set. If yes, the, box 613 is entered and the premium channel for the pay-per-view channel is not jammed, nor is the subscriber disconnect switch opened. At box 614, this pay-per-view load communication is done.

The path 608–614 then assumes a conflict situation exists where the periodic service is in conflict with a purchased pay-per-view event and the channel on which the pay-per-view event is broadcast is not jammed until the event is over, nor is the switch 389 opened.

If at box 610, there are no pay-per-view events in-use and authorized to the particular periodic service subscriber, then, at box 611, the service denial circuit such as switch 389 is opened and service disconnected. Thus, at box 612, the controller 260 is done.

If at box 609, this is not periodic service, then box 615 is entered. If the in-use bit for the communicated event or service code is not in-use at box 615, then the controller 260 is done at box 612. On the other hand, if the pay-per-view event or service code is in use, it must be a service code for periodic service and data stored in memory of controller 260 is regarded at box 616 to determine whether a power up on video bit position is clear or set to disconnect.

This option relates to whether it is more desirable to close a disconnect device such as switch 389 before the jamming signals are calibrated or whether it is preferable to calibrate the jamming signals before closing the disconnect device such as switch 389. In the case of a typically parentally controlled channel, it may be preferable, for example, to calibrate and turn on the jamming oscillators before the switch is closed to assure that no viewers are offended by the program content.

Path 616, 617, 618, to done 619 may, for example, be followed for a parentally controlled channel. Path 620, 621 to done 619 may, for example, be followed for a non-parentally controlled channel. In either event, boxes 618 and 620 relate to the periodic closing of a service disconnect switch (to connect service) so that a periodic service subscriber may receive signal representing all allocated channels for a subscribed-to periodic service offering.

If at box 608, the disconnect flag in memory 608 for a particular subscriber is in its connect or closed state, then, the path via box 622 is followed. Box 622, however, relates to a function accomplished by controller 270 which is peripherally related to the present invention. At box 622, a bit in memory indicating whether the subscriber module of FIG. 3 is home powered is regarded and then a sensor lead checked to determine if the subscriber has disconnected power, for example, by disconnecting a wall power transformer. If the answer is yes, the controller is done at box 623. Otherwise, the controller enters box 624 for regarding the stored in-use bit to determine if the updated and stored in-use bit from FIG. 6 is in-use. If yes, then, just as at box 613, the premium channel(s) on which the event or service is in-use is not jammed at box 625 and the controller is done at box 626.

If the in-use bit is not set to in-use for the received service or event data 404 then box 627 is entered. Calibration in the clear means that the disconnect devices remain in their connect state and the jamming oscillators are calibrated to jam the premium channels for the received event/service code. The controller is then done at box 628.

Now returning to FIG. 6, the pay-per-view start communication will be described. Such a communication is not needed, for example, if a pay-per-view load communication for the same event or service is received and the communicated in-use bit is set to in-use. The purpose of the global start communication entered at box 660 is to start a service or event for an already down-loaded service or event code whose in-use bit is set to off.

If at box 661 the event or service code 404 received with the start communication does not exist in memory positions 412 of FIG. 4b for any subscriber, then, the controller is done at box 650. If the event or service code 404 if found in memory positions 412 of FIG. 4b is already in-use at box 662 per associated in-use bit 411, then, also, the controller is done at box 650.

If the pay-per-view event exists in memory and the associated in-use bit 411 is not set to in-use, then, box 663 is entered. At box 663, the in-use bit 411 associated with data code 4 12 is set to in-use for the received event or service code 404, and so, for all previously authorized subscribers.

Thereafter, FIG. 7 is entered at box 608 just as in a PPV load communication and followed as already described.

Referring now to FIG. 8, two slightly different communications will be described in terms of their effect on service/event authorization memory according to FIG. 4b.

The global third off communication simply changes the in-use bit from in-use to not in-use for an authorized periodic subscriber. On the other hand, the addressed of global service or event code purge communication erases the received event or service code from memory.

First describing the global event/service code off communication, the respective opcode 402 for the off command is recognized at box 800 and box 801 entered. Practically speaking the opcodes for each may be identical, the primary difference in communications being whether the whole memory is purged and whether the communication is addressed.

At box 801, the transmitted event or service code data 404 is compared with data 412 in memory to determine if the event service code is already loaded in memory. If the event/service code is not loaded in memory 412, then, the controller is done at box 802.

If the transmitted event or service code 404 exists in memory, then, at box 803, an associated purge bit transmitted with the communication, not specifically shown in FIG. 4a, is regarded at box 803. If this is a global purge for the event or service, then, at box 807, the subscriber data 410 for all subscriber bits is cleared. Then, the event or service code 412 corresponding to the received data code 404 is purged from memory.

If this was not a purge, then, at box 804, only the in-use bit for the transmitted event or service code 404 is cleared. This is the typical third global off communication path followed when temporarily disconnecting a periodic service offering.

Whether path 807, 808 is taken or the path via box 804, then, box 805 is entered. Also, as will be subsequently described in connection with the addressed or global service/event code purge communication, box 805 is likewise entered from the path 820 via 829, 830 or via 832, 833. At box 805, the controller 260 determines whether the allocated channels or premium channel was authorized and in-use at the time of receipt. If not, the controller is done.

If the in-use bit for the received service or event code data is in-use, then box 809 is entered. The intended subscriber disconnect status is then regarded in memory 270. If the subscriber is intended to be disconnected, then, the event data for that subscriber is regarded at box 813 to determine if any events are in use. If there are events in-use at box 813, then, the path for the periodic service subscriber being connected is followed to box 810. At box 810, subscriber oscillators are calibrated to jam only those premium channels that are newly jammed. At box 811, those premium channels are jammed and the controller is done at box 812.

On the other hand, if at box 813, there are no pay-per-view event or periodic service codes in use, then box 813 is entered. At box 814, the subscriber connect circuits such as switch 389 are set to open or disconnect. Then, the controller is done at box 812.

Thus, boxes 809–814 are analogous to boxes 616–621 of FIG. 7. Boxes 809–814 represent a periodic opening (to disconnect service temporarily) of a service denial device such as switch 389. Switch 389 periodically connects a periodic service subscriber via FIG. 7 and disconnects the periodic service subscriber via FIG. 8.

Now, the addressed or global pay-per-view event or periodic service code purge communication will be discussed in connection with the activities of controller 260. The purge communication op-code 402 is recognized at box 820. Then, at box 821, if the communication is global the control path merges with the Off communication described beginning at box 800 if the received service or event code data 404 is found in memory portion 412 at box 822. If the received event or service code 404 is not found in memory, the controller is done at box 823.

If the communication is addressed at box 821, then box 824 is entered. If the received address 401 is not either a group address for the subscribers served by apparatus 56 or a specific equipment address for a subscriber served, then, the communication is ignored, and the controller is done at box 823.

If the received purge communication is an addressed communication, then, at box 825 the refresh counter and home power counters are reset in a similar manner as at boxes 604 and 605 described in connection with an addressed PPV load communication. After box 825, box 826 is entered and the controller 260 determines whether the received data code 404 exists in memory portion 412. If not, then the controller is done at box 823. Otherwise, box 827 is entered.

Box 827 represents a determination as to whether an entire memory portion 412 comprising a plurality of service or event codes is to be purged. If all code data is to be purged at box 827, then, at box 831, the subscriber data 410 for the received subscriber address 401 is cleared of authorization bits. The event or service data 412 will remain in memory if another subscriber is authorized. Thus, at box 832, for each event where the addressed subscfiber's authorization bit has been cleared, it is determined whether all the other subscriber authorization bits 410 are cleared. If so, then at box 833, the event or service codes for the purge all communication are purged as appropriate. If not, then the event or service code is allowed to remain for the other authorized subscribers. In either case, box 805 is entered from box 832 or box 833.

Now, if the particular communication for the addressed subscriber is not a purge all communication at box 827, then at box 828, according to the received address data 401, the associated subscriber authorization bit (or bits if the group of all four served subscribers) is cleared for the received event or service code data 404.

Then, box 829 is entered and, for the received event or service code data 404, the controller 260 determines if any of the other subscribers are authorized per associated bits 410. If all bits are not cleared, the event cannot be purged and box 805 is entered. If all the subscriber authorization bits 410 are clear (none is authorized), then, the received event or service code is purged from memory portion 412. Thereafter box 805 is entered as described above.

Thus, there has been shown and described a method and apparatus for providing a periodic service offering to potential subscribers to a subscription service which meets the stated objects of the present invention and which should only be deemed to be limited by the scope of the claims which follow.

We claim:

1. A service denial apparatus for controlling service to subscribers of a subscription system, the service denial apparatus comprising:

a decoder for decoding communications received from a service provider of the subscription system, the communications including a first communication, a second communication and a third communication;

a memory;

service denial circuitry for selectively permitting and denying service to a particular subscriber; and a control circuit for, storing a data code in the memory when the first communication is received, the data code representing a periodic service offering and also indicating a predetermined plurality of channels allocated to the periodic service offering, actuating the service denial circuitry to permit reception of service by the particular subscriber on the predetermined plurality of channels when the second communication is received, and actuating the service denial circuitry to deny reception of service by the particular subscriber when the third communications is received.

2. The service denial apparatus according to claim 1, wherein the service denial circuitry includes a switch for denying reception of service when a service denial switching state is selected.

3. The service denial apparatus according to claim 1, wherein the service denial circuitry includes a jamming circuit for jamming at least one channel of the predetermined plurality of channels when a service denial switching state is selected, the reception of each channel of the at least one channel by the particular subscriber being unauthorized.

4. The service denial apparatus according to claim 1, wherein the first communication, the second communication, and the third communication are intended only for the particular subscriber.

5. Service denial apparatus for periodically permitting and denying service to subscribers of a subscription system, the service denial apparatus comprising a communications receiver for receiving communications from a service provider, a communications decoder, responsive to the communications receiver, for decoding communications received from the service provider, a memory for storing instructions and data for periodically permitting and denying service to a particular subscriber, selective service denial circuitry for selectively permitting and denying service to the particular subscriber, and a control circuit, responsive to the communications decoder and the memory, for selectively actuating the memory and the selective service denial circuitry, the control circuit responsive to a first communication actuating storage in the memory of a data code representing a periodic service offering, the data code further indicating a predetermined plurality of channels allocated to the periodic service offering and responsive to a second communication at a first predetermined time actuating the selective service denial circuitry to permit reception of service by the particular subscriber on the predetermined plurality of channels and, responsive to a third communication at a second predetermined time actuating the service denial circuitry to deny reception of service by the particular subscriber.

6. The service denial apparatus according to claim 5, wherein the second and third communications each comprise an address representing a plurality of subscribers.

7. The service denial apparatus according to claim 5, wherein the first communication comprises an address uniquely representing the particular subscriber.

8. The service denial apparatus according to claim 5, wherein the first communication comprises an address representing a plurality of subscribers.

9. The service denial apparatus according to claim 5, wherein the first communication comprises at least one data bit representing the status of the periodic service offering.

10. The service denial apparatus according to claim 5, wherein the service denial apparatus is located external to subscriber premises.

11. The service denial apparatus according to claim 5, wherein the service denial apparatus is shared by a plurality of subscribers.

12. The service denial apparatus according to claim 5, wherein the first and second predetermined times define a time interval for a particular periodic service offering.

13. The service denial apparatus according to claim 12, wherein the time interval comprises at least one selected day of the week.

14. The service denial apparatus according to claim 4, wherein the selective service denial circuitry comprises a switch for denying reception of service and a jamming circuit for jamming channels which a subscriber is not authorized to receive when a service denial switching state is selected.

15. The service denial apparatus according to claim 14, wherein the memory comprises non-volatile memory for storing a status bit representing an intended switching state of the switch and random access memory for storing an existing switching state of the switch and the control circuit appropriately actuates the switch when the status bit and the existing switching state are not equivalent.

16. The service denial apparatus according to claim 5, further comprising a headend for transmitting communications and a broadband television signal from the service provider to the communications receiver, a first medium connecting the headend and the communications receiver, and a second medium for connecting the first medium to a television signal receiver, the television signal receiver receiving at least the predetermined plurality of channels via the second medium.

17. The service denial apparatus according to claim 16, the communications receiver particularly comprising a directional coupler for coupling the first and second mediums and a data receiver for receiving communications from the headend.

18. The service denial apparatus according to claim 5, the first communication comprising data representing at least one periodic service data code indicating a corresponding predetermined plurality of channels allocated to a periodic service offering.

19. The service denial apparatus according to claim 5, the data code representing the periodic service offering having an absence of channel data, the absence of channel data representing at least one predetermined channel allocated to the periodic service offering.

20. A subscription television system comprising a headend for addressably transmitting communications to a particular subscriber;

a receiver for receiving communications from the headend;

a decoder, responsive to the receiver, for decoding communications addressably transmitted to the particular subscriber;

a memory for storing instructions and data for permitting and denying service to the particular subscriber;

a service denying circuit for controlling whether the particular subscriber receives a periodic service offering, the periodic service offering being received over at least one channel; and a control circuit, responsive to the decoder, for controlling the service denying circuit to allow the particular subscriber to receive the periodic service offering over the at least one channel responsive to a first communication indicating a start time of the periodic service offering, and for controlling the service denying circuit to inhibit the particular subscriber from receiving the periodic service offering over the at least one channel responsive to a second communication indicating an end time of the periodic service offering.

21. The system of claim 20, wherein a period between the start time and the end time is one of a prescribed length of the periodic service offering and a subscriber selected length.

22. The system of claim 20, wherein the at least one channel includes at least one non-scrambled channel.

23. Service denial apparatus for periodically permitting and denying service to subscribers of a subscription system, the service denial apparatus comprising, a communications receiver for receiving communications from a service provider, a communications decoder, responsive to the communications receiver, for decoding communications received from the service provider, a memory for storing instructions and data for periodically permitting and denying service to a particular subscriber, selective service denial circuitry for selectively permitting and denying service to the particular subscriber, and a control circuit, responsive to the communications decoder and the memory, for selectively actuating the memory and the selective service denial circuitry, the control circuit responsive to a communication actuating storage in the memory of a data code representing a periodic service offering, the data code further indicating a predetermined plurality of channels allocated to the periodic service offering.

* * * * *

UNITED STATES PATENT AND TRADEMARK OFFICE
CERTIFICATE OF CORRECTION

PATENT NO. : 5,604,528
DATED : February 18, 1997
INVENTOR(S) : Edwards et al.

It is certified that error appears in the above-indentified patent and that said Letters Patent is hereby corrected as shown below:

ON THE TITLE PAGE

Please correct the [63] Related U.S. Application Data information as follows:

Delete "895,582"

The correct Related U.S. Application Data information is:

--896,582--

Signed and Sealed this

Seventeenth Day of June, 1997

Attest:

BRUCE LEHMAN

*Attesting Officer*  *Commissioner of Patents and Trademarks*